United States Patent
Park et al.

(10) Patent No.: US 9,924,182 B2
(45) Date of Patent: Mar. 20, 2018

(54) METHOD FOR PREDICTING DISPARITY VECTOR BASED ON BLOCKS FOR APPARATUS AND METHOD FOR INTER-LAYER ENCODING AND DECODING VIDEO

(71) Applicant: SAMSUNG ELECTRONICS CO., LTD., Suwon-si (KR)

(72) Inventors: Min-woo Park, Hwaseong-si (KR); Jin-young Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 235 days.

(21) Appl. No.: 14/904,535

(22) PCT Filed: Jul. 14, 2014

(86) PCT No.: PCT/KR2014/006332
§ 371 (c)(1),
(2) Date: Jan. 12, 2016

(87) PCT Pub. No.: WO2015/005749
PCT Pub. Date: Jan. 15, 2015

(65) Prior Publication Data
US 2016/0173888 A1 Jun. 16, 2016

Related U.S. Application Data

(60) Provisional application No. 61/845,501, filed on Jul. 12, 2013.

(51) Int. Cl.
*H04N 19/31* (2014.01)
*H04N 19/136* (2014.01)
(Continued)

(52) U.S. Cl.
CPC ........... *H04N 19/31* (2014.11); *H04N 19/105* (2014.11); *H04N 19/136* (2014.11);
(Continued)

(58) Field of Classification Search
CPC ...... H04N 19/31; H04N 19/187; H04N 19/44; H04N 19/176; H04N 19/52; H04N 19/136
See application file for complete search history.

(56) References Cited

U.S. PATENT DOCUMENTS 9,232,229 B2 1/2016 Kim
2012/0269268 A1 10/2012 Kim et al.
(Continued)

FOREIGN PATENT DOCUMENTS

CN 102946535 A 2/2013
CN 104904219 A 9/2015
(Continued)

OTHER PUBLICATIONS

Communication dated Apr. 7, 2016, issued by the Korean Intellectual Property Office in counterpart Korean Patent Application No. 10-2015-7011350.
(Continued)

*Primary Examiner* — Hee-Yong Kim
(74) *Attorney, Agent, or Firm* — Sughrue Mion, PLLC

(57) ABSTRACT

An inter-layer video decoding method includes searching for a neighboring block candidate which neighbors a current block and has a motion vector in an inter-layer direction, from among spatial and temporal neighboring block candidates; when the neighboring block candidate having the motion vector in the inter-layer direction is found, setting the motion vector in the inter-layer direction of the found neighboring block candidate as a disparity vector of the current block; when the neighboring block candidate having
(Continued)

the motion vector in the inter-layer direction is not found, searching for a neighboring block candidate having disparity vector information from among the spatial and temporal neighboring block candidates; and when the neighboring block candidate having the disparity vector information is found, predicting a disparity vector of the current block based on the disparity vector information of the found candidate.

15 Claims, 35 Drawing Sheets

(51) Int. Cl.
<table>
<tr><td>H04N 19/176</td><td>(2014.01)</td></tr>
<tr><td>H04N 19/52</td><td>(2014.01)</td></tr>
<tr><td>H04N 19/187</td><td>(2014.01)</td></tr>
<tr><td>H04N 19/44</td><td>(2014.01)</td></tr>
<tr><td>H04N 7/32</td><td>(2006.01)</td></tr>
<tr><td>H04N 19/597</td><td>(2014.01)</td></tr>
<tr><td>H04N 19/105</td><td>(2014.01)</td></tr>
<tr><td>H04N 19/30</td><td>(2014.01)</td></tr>
<tr><td>H04N 19/196</td><td>(2014.01)</td></tr>
</table>

(52) U.S. Cl.
CPC ......... *H04N 19/176* (2014.11); *H04N 19/187* (2014.11); *H04N 19/196* (2014.11); *H04N 19/30* (2014.11); *H04N 19/44* (2014.11); *H04N 19/52* (2014.11); *H04N 19/597* (2014.11)

(56) References Cited

U.S. PATENT DOCUMENTS

<table>
<tr><td>2013/0287093 A1*</td><td>10/2013</td><td>Hannuksela ..... H04N 19/00769<br>375/240.02</td></tr>
<tr><td>2014/0002599 A1</td><td>1/2014</td><td>Lee et al.</td></tr>
<tr><td>2014/0294088 A1</td><td>10/2014</td><td>Sung et al.</td></tr>
<tr><td>2015/0215643 A1</td><td>7/2015</td><td>Lin</td></tr>
<tr><td>2015/0341664 A1</td><td>11/2015</td><td>Zhang et al.</td></tr>
</table>

FOREIGN PATENT DOCUMENTS

<table>
<tr><td>KR</td><td>10-2011-0027480 A</td><td>3/2011</td></tr>
<tr><td>KR</td><td>10-1039204 B1</td><td>6/2011</td></tr>
<tr><td>KR</td><td>10-2012-0080122 A</td><td>7/2012</td></tr>
<tr><td>KR</td><td>10-2013-0044189 A</td><td>5/2013</td></tr>
<tr><td>WO</td><td>2013/005963 A2</td><td>1/2013</td></tr>
<tr><td>WO</td><td>2013/039348 A1</td><td>3/2013</td></tr>
<tr><td>WO</td><td>2013/055148 A2</td><td>4/2013</td></tr>
<tr><td>WO</td><td>2013/103879 A1</td><td>7/2013</td></tr>
<tr><td>WO</td><td>2014107853 A1</td><td>7/2014</td></tr>
<tr><td>WO</td><td>2014138450 A1</td><td>9/2014</td></tr>
</table>

OTHER PUBLICATIONS

Communication dated Sep. 28, 2016, issued by the Korean Intellectual Property Office in counterpart Korean Application No. 10-2015-7011350.
Communication dated Jan. 4, 2017, issued by the Japanese Patent Office in counterpart Japanese Application No. 2016-525296.
Communication dated Jan. 23, 2017, issued by the European Patent Office in counterpart European Application No. 14823022.0.
Gerhard Tech et al., "3D-HEVC Test Model 4", Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, Document: JCT3V-D1005-v4, Total 6 pages.
Jin Heo et al., "3D-CE1.h related: Improved DV for BVSP in depth", Joint Collaborative Team on 3D Video Coding Extension Development of ITUT SG 16 WP 3 and ISO/IEC JTC 1/SC 29/WG 11, 4th Meeting: Incheon, KR, Apr. 20-26, 2013, Document: JCT3V-D0137, Total 7 pages.
Gerhard Tech et al., "3D-HEVC Test Model 3", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-C1005_d0, Total 51 pages, XP 030130664.
Li Zhang et al: "Disparity vector based advanced inter-view prediction in 3D-HEVC", Circuits and Systems (ISCAS), 2013 IEEE International Symposium on, IEEE, May 19, 2013, pp. 1632-1635, XP032446248.
Zhang N et al., "3D-CE2. h related: Improved DV searching order", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-00141, Total 3 pages, XP030130557.
Lee J Y et al., "3D-CE2. h related results on disparity vector derivation", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-00097, Total 4 pages, XP030130513.
Park M W et al., "3D-CE2.h related: Default disparity vector derivation", Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, Document: JCT3V-D0112, Total 4 pages, XP030130776.
Tadashi Uchiumi et al., "Additional tool for depth-based prediction with D-MVP (3DVAVC)", ISO/IEC JTC 1/SC 29/WG 11 MPEG2012/M23872, Feb. 1, 2012, San Jose, USA, Total 4 pages, XP030052397.
Park M W et al., "3D-CE2.h related: Simplified NBDV and improved disparity vector derivation", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, Document: JCT3V-E0142, Total 9 pages, XP030131163.
Chang, et al., "3D-CE2.h related: Simplified DV derivation for DoNBDV and BVSP", 2013, Joint Collaborative Team on 3D Video Coding Extension Development of ITU-T SG 16 WP 3 and ISO/IEC JTC 1/SC 29/WG 11, 4th Meeting, Incheon, KR, JCT3V-D0138, 6 pages total.
Communication dated Jun. 27, 2017, issued by the Japanese Patent Office in counterpart Japanese Patent Application No. 2016-525296.
Communication dated Oct. 17, 2014 issued by the International Searching Authority in counterpart International Application No. PCT/KR2014/006332 (PCT/ISA/210/373/237/220).

* cited by examiner

METHOD FOR PREDICTING DISPARITY VECTOR BASED ON BLOCKS FOR APPARATUS AND METHOD FOR INTER-LAYER ENCODING AND DECODING VIDEO

CROSS-REFERENCE TO RELATED PATENT APPLICATIONS

This application claims priority from PCT/KR2014/006332, filed on Jul. 14, 2014, and claims the benefit of U.S. Provisional Patent Application No. 61/845,501, filed on Jul. 12, 2013, in the United States Patent and Trademark Office, the disclosures of which are incorporated herein by reference in their entireties.

1. TECHNICAL FIELD

The exemplary embodiments relate to inter-layer video encoding and decoding methods, and more particularly, to a method of determining a disparity vector based on blocks with respect to inter-layer video encoding and decoding methods.

2. BACKGROUND OF THE RELATED ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are more easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a first layer video and at least one second layer video. Amounts of data of the first layer video and the second layer video may be reduced by removing temporal or spatial redundancy and layer redundancy of the first layer video and the second layer video.

A method of predicting a disparity vector for encoding and decoding an image may include a method of predicting a disparity vector of a current block by using neighboring block candidates. However, when searching for neighboring blocks to determine the neighboring block candidates, distances between the current block and the neighboring blocks are not considered. Thus, a far neighboring block may have a search priority. In this case, an inaccurate neighboring block may be determined as the neighboring block candidate.

SUMMARY

Accordingly, exemplary embodiments provide methods and apparatuses for accurately predicting a disparity vector by performing, by an inter-layer video encoding or decoding apparatus according to one or more exemplary embodiments, disparity vector prediction by using neighboring block candidates close to the current block.

Technical aspects of the exemplary embodiments are not limited to the above, and other technical aspects that are not mentioned will become apparent to one of ordinary skill in the art from the following description.

According to an aspect of an exemplary embodiment, there is provided an inter-layer video decoding method including: searching for a neighboring block candidate which neighbors a current block and has a motion vector in an inter-layer direction, from among a spatial neighboring block candidate located at a left side of the current block, a spatial neighboring block candidate located at a top of the current block, and temporal neighboring block candidates at co-located locations of the current block; when the neighboring block candidate having the motion vector in the inter-layer direction is found, setting the motion vector in the inter-layer direction of the found neighboring block candidate as a disparity vector of the current block; when the neighboring block candidate having the motion vector in the inter-layer direction is not found, searching for a neighboring block candidate which neighbors the current block and has disparity vector information, from among the spatial neighboring block candidate located at the left side of the current block, the spatial neighboring block candidate located at the top of the current block, and the temporal neighboring block candidates at the co-located locations of the current block; and when the neighboring block candidate having the disparity vector information is found, predicting a disparity vector of the current block based on the disparity vector information of the found neighboring block candidate.

The searching for the neighboring block candidate having the motion vector in the inter-layer direction may include searching for the neighboring block candidate having the motion vector in the inter-layer direction from among a spatial neighboring block candidate located lowest from blocks adjacent to a left boundary of the current block, a spatial neighboring block located rightmost from blocks adjacent to a top boundary of the current block, and the temporal neighboring block candidates at co-located locations of the current block.

The searching for the neighboring block candidate having the disparity vector information may include determining whether a spatial neighboring block located lowest from blocks adjacent to a left boundary of the current block and a spatial neighboring block candidate located rightmost from blocks adjacent to a top boundary of the current block are used to perform inter-layer motion compensation.

The searching for the neighboring block candidate having the motion vector in the inter-layer direction may include omitting searching for temporal neighboring block candidates and spatial neighboring block candidates located in a diagonal direction of the current block.

The searching for the neighboring block candidate having the motion vector in the inter-layer direction may include searching for the neighboring block candidate having the motion vector in the inter-layer direction by prioritizing the spatial neighboring block candidate located at the left of the current block, the spatial neighboring block candidate located at the top of the current block, and the temporal neighboring block candidates at the co-located locations of the current block.

The searching for the neighboring block candidate having the motion vector in the inter-layer direction may include searching for the neighboring block candidate having the motion vector in the inter-layer direction by prioritizing one of the temporal neighboring block candidates included in a co-located picture when at least two reference pictures in a time direction are found.

The inter-layer video decoding method may further include, when the disparity vector of the current block is not predicted, determining the disparity vector of the current block by using a default disparity vector and an inter-layer depth image.

The inter-layer video decoding method may further include, when the disparity vector of the current block is predicted to be (0,0), determining the disparity vector of the current block to be a value that is not (0,0) by using an inter-layer depth map.

The inter-layer video decoding method may, further include, when the disparity vector of the current block is predicted to be (0,0), refraining from using a mode that uses the predicted disparity vector.

According to an aspect of another exemplary embodiment, there is provided an inter-layer video decoding apparatus including: a first layer decoder configured to reconstruct a first layer image based on encoding information obtained from a bitstream; and a disparity vector determiner configured to search for a neighboring block candidate which neighbors a second layer current block and has a motion vector in an inter-layer direction, from among a spatial neighboring block candidate located at a left side of the second layer current block, a spatial neighboring block candidate located at a top of the second layer current block, and temporal neighboring block candidates at co-located locations of the second layer current block, wherein, when the neighboring block candidate having the motion vector in the inter-layer direction is found, the disparity vector determiner is configured to set the motion vector in the inter-layer direction of the found neighboring block candidate as a disparity vector of the second layer current block, wherein, when the neighboring block candidate having the motion vector in the inter-layer direction is not found, the disparity vector determiner is configured to search for a neighboring block candidate which neighbors the second layer current block and has disparity vector information from among the spatial neighboring block candidate located at the left side of the second layer current block, the spatial neighboring block candidate located at the top of the second layer current block, and the temporal neighboring block candidates at the co-located locations of the second layer current block, and when the neighboring block candidate having the disparity vector information is found, the disparity vector determiner is configured to predict the disparity vector of the second layer current block based on disparity vector information of the found neighboring block candidate.

The disparity vector determiner may be configured to perform a search for predicting the disparity vector from among a spatial neighboring block candidate located lowest from blocks adjacent to a left boundary of the current block, a spatial neighboring block located rightmost from blocks adjacent to a top boundary of the current block, and the temporal neighboring block candidates at co-located locations of the second layer current block.

The disparity vector determiner may be configured to omit searching temporal and spatial neighboring block candidates located in a diagonal direction of the second layer current block.

The disparity vector determiner may be configured to search for the neighboring block candidate having the motion vector in the inter-layer direction by prioritizing one of the temporal neighboring block candidates included in a co-located picture when at least two reference pictures in a time direction are found.

The disparity vector determiner may be configured to determine, when the disparity vector of the current block is not predicted, the disparity vector of the current block by using a default disparity vector and an inter-layer depth image.

According to an aspect of another exemplary embodiment, there is provided a non-transitory computer-readable recording medium having recorded thereon a program which, when executed, causes a decoding apparatus to perform an inter-layer video decoding method according to an aspect of an exemplary embodiment.

According to an exemplary embodiment, a method of accurately predicting a disparity vector is provided to increase encoding efficiency and in addition, simplify a process operation, thereby reducing complexity of encoding and decoding apparatuses.

DETAILED DESCRIPTION OF THE EXEMPLARY EMBODIMENTS

Hereinafter, an inter-layer video encoding technique and an inter-layer video decoding technique, which determine a disparity vector by using a reference layer depth map, according to exemplary embodiments will be described with reference to FIGS. 1A through 7D. Also, a video encoding technique and a video decoding technique, which are based on coding units having a tree structure, according to exemplary embodiments applicable to the inter-layer video encoding and decoding techniques will be described with reference to FIGS. 8 through 20. Also, various exemplary embodiments to which the video encoding method and the video decoding method are applicable, will be described with reference to FIGS. 21 through 27.

Hereinafter, according to an exemplary embodiment, an 'image' may denote a still image or a video.

Hereinafter, according to an exemplary embodiment, a 'sample' may denote data that is assigned to a sampling location of an image and is to be processed. For example, pixels in an image of a spatial domain may be samples.

Hereinafter, according to an exemplary embodiment, a 'current block' may denote a block of an image to be encoded or decoded.

Hereinafter, according to an exemplary embodiment, a 'neighboring block' around a current block may denote at least one encoded or decoded block adjacent to the current block. For example, a neighboring block may be located at the top, upper right, left, or upper left of a current block. Also, a neighboring block may be a spatial neighboring block or a temporal neighboring block.

First, a method of predicting a disparity vector based on blocks, which is a method for inter-layer video decoding and encoding apparatuses and methods according to exemplary embodiments, will be described with reference to FIGS. 1A through 7D.

Figure 1A:
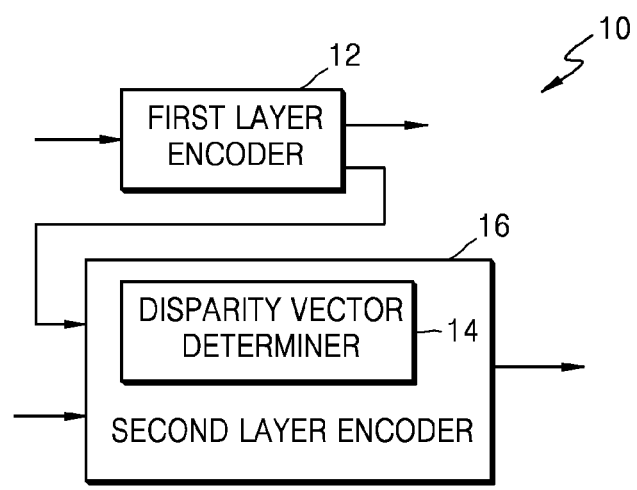
FIG. 1A is a block diagram of an inter-layer video encoding apparatus according to an exemplary embodiment.
Figure 1B:
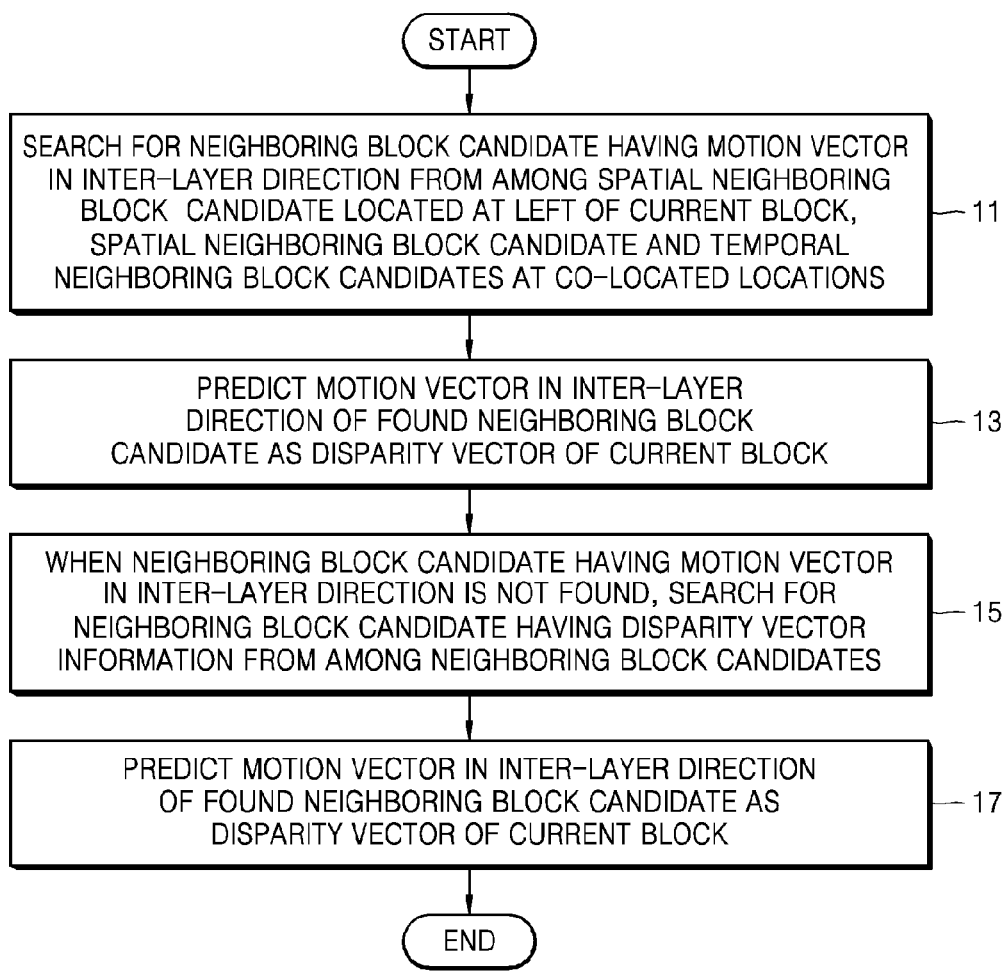
FIG. 1B is a flowchart of an inter-layer video encoding method according to an exemplary embodiment.

FIG. 1A is a block diagram of an inter-layer video encoding apparatus 10 according to an exemplary embodiment. FIG. 1B is a flowchart of an inter-layer video encoding method according to an exemplary embodiment.

The inter-layer video encoding apparatus 10 according to an exemplary embodiment includes a first layer encoder 12 and a second layer encoder 16. The second layer encoder 16 may include a disparity vector determiner 14. The disparity vector determiner 14 may be located outside the second layer encoder 16.

The inter-layer video encoding apparatus 10 according to an exemplary embodiment may classify a plurality of image sequences according to layers and encode each of the image sequences according to a scalable video coding method, and output separate streams including data encoded according to layers. The inter-layer video encoding apparatus 10 may encode a first layer image sequence and a second layer image sequence to different layers.

The first layer encoder 12 may encode first layer images and output a first layer stream including encoding data of the first layer images.

The second layer encoder 16 may encode second layer images and output a second layer stream including encoding data of the second layer images.

For example, according to a scalable video coding method based on spatial scalability, low resolution images may be encoded as first layer images, and high resolution images may be encoded as second layer images. An encoding result of the first layer images is output as a first layer stream, and an encoding result of the second layer images is output as a second layer stream.

As another example, a multiview video may be encoded according to a scalable video coding method. In this case, central view images may be encoded as first layer images, and left view images and right view images may be encoded as second layer images by referring to the first layer images. Alternatively, when the inter-layer video encoding apparatus 10 allows at least three layers, for example, first through third layers, central view images may be encoded as first layer images, left view images may be encoded as second layer images, and right view images may be encoded as third layer images. Of course, exemplary embodiments are not limited thereto, and layers and referenced layers obtained by encoding central view, left view, and right view images may vary.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding high frame rate images by referring to the base frame rate images.

Also, scalable video coding may be performed on a first layer and a plurality of second layers. When there are at least three second layers, first layer images and first through K-th second layer images may be encoded. Accordingly, an encoding result of the first layer images may be output as a first layer stream, and encoding results of the first through K-th second layer images may be respectively output as first through K-th second layer streams.

The inter-layer video encoding apparatus 10 according to an exemplary embodiment may perform inter prediction in which images of a single layer are referenced in order to predict a current image. By performing inter prediction, a motion vector indicating motion information between a current image and a reference image, and a residual between the current image and the reference image may be generated.

Also, the inter-layer video encoding apparatus 10 may perform inter-layer prediction in which first layer images are referenced in order to predict second layer images.

Also, when the inter-layer video encoding apparatus 10 according to some exemplary embodiments allows at least three layers, e.g., first through third layers, inter-layer prediction between a first layer image and a third layer image, and inter-layer prediction between a second layer image and a third layer image may be performed according to a multi-layer prediction structure.

Via inter-layer prediction, a position difference component between a current image and a reference image of a layer different from a layer of the current image and a residual between the current image and the reference image of the different layer may be generated.

An inter-layer prediction structure will be described later with reference to FIG. 3.

The inter-layer video encoding apparatus 10 according to an exemplary embodiment may perform encoding according to blocks of each image of a video, according to layers. A block may have a square shape, a rectangular shape, or an arbitrary geometrical shape, and is not limited to a data unit having any particular predetermined size. The block may be a maximum coding unit, a coding unit, a prediction unit, or a transformation unit, among coding units according to a tree structure. A maximum coding unit including coding units of a tree structure may be referred to in different ways, such as a coding tree unit, a coding block tree, a block tree, a root block tree, a coding tree, a coding root, or a tree trunk. Video encoding and decoding methods based on coding units according to a tree structure will be described later with reference to FIGS. 8 through 20.

Inter prediction and inter-layer prediction may be performed based on a data unit, such as a coding unit, a prediction unit, or a transformation unit.

The first layer encoder 12 according to an exemplary embodiment may generate symbol data by performing source coding operations including inter prediction or intra prediction on first layer images. Symbol data indicates a sample value of each encoding parameter and a sample value of a residual.

For example, the first layer encoder 12 may generate symbol data by performing inter or intra prediction, transformation, and quantization on samples of a data unit of first layer images, and generate a first layer stream by performing entropy encoding on the symbol data.

The second layer encoder 16 may encode second layer images based on coding units of a tree structure. The second layer encoder 16 may generate symbol data by performing inter/intra prediction, transformation, and quantization on samples of a coding unit of second layer images, and generate a second layer stream by performing entropy encoding on the symbol data.

The second layer encoder 16 according to an exemplary embodiment may perform inter-layer prediction in which a second layer image is predicted by using prediction information of a first layer image. In order to encode a second layer original image from a second layer image sequence through an inter-layer prediction structure, the second layer encoder 16 may determine prediction information of a second layer current image by using prediction information of a first layer reconstructed image, and encode a prediction error between the second layer original image and a second layer prediction image by generating the second layer prediction image based on the determined prediction information.

The second layer encoder 16 may determine a block of a first layer image to be referenced by a block of a second layer image by performing inter-layer prediction according to blocks, such as coding units or prediction units, on the second layer image. For example, a reconstruction block of the first layer image, which is located in a position corresponding to a location of a current block in the second layer image, may be determined. The second layer encoder 16 may determine a second layer prediction block by using a first layer reconstruction block corresponding to a second layer block.

The second layer encoder 16 may use the second layer prediction block determined by using the first layer reconstruction block according to an inter-layer prediction block, as a reference image for inter-layer prediction of a second layer original block. The second layer encoder 16 may perform entropy encoding by transforming and quantizing an error, e.g., a residual according to inter-layer prediction, between a sample value of a second layer prediction block and a sample value of a second layer original block, by using a first layer reconstruction image.

When the inter-layer video encoding apparatus 10 described above encodes a multiview video, a first layer image that is encoded may be a first view video and a second layer image may be a second view video. Since the first and second views of such a multiview image are obtained at the same time, similarity between images according to views is high.

However, a multiview image may have a disparity since characteristics of photographing angles, lighting, and photographing devices (e.g., a camera and a lens) are different according to views. Accordingly, encoding efficiency may be increased by performing disparity compensated prediction in which such a disparity is indicated as a disparity vector, and a region that is most similar to a block to be currently encoded is found and encoded from a different view image by using the disparity vector.

The inter-layer video encoding apparatus 10 may determine a disparity vector for inter-layer prediction and transmit the disparity vector to a decoding apparatus through a bitstream, as separate information.

Alternatively, the inter-layer video encoding apparatus 10 may predict (or derive) a disparity vector from different types of encoding information so as to decrease a data amount transmitted according to prediction units. For example, a disparity vector may be predicted from neighboring blocks of a block to be currently reconstructed. If a disparity vector is not predicted from the neighboring blocks, a default disparity vector may be set as the disparity vector.

When the inter-layer video encoding apparatus 10 does not consider distances between a current block and neighboring blocks when searching for neighboring block candidates to determine a neighboring block to be used for disparity vector prediction, a neighboring block that is distant from the current block may have a search priority. In this case, a neighboring block candidate having low prediction accuracy due to a long distance may be determined as a neighboring block candidate to be used for disparity vector prediction, instead of a near neighboring block candidate having high prediction accuracy.

Thus, the inter-layer video encoding apparatus 10 according to some exemplary embodiments may perform disparity vector prediction by using neighboring block candidates near a current block, thereby providing a method of accurately predicting a disparity vector. Also, by using the inter-layer video encoding apparatus 10, encoding efficiency may be increased, and in addition, processing operations may be simplified, thereby decreasing complexity of an encoding apparatus.

A method of determining, by the inter-layer video encoding apparatus 10, a disparity vector according to an exemplary embodiment, will be described in detail later with reference to FIGS. 4 through 7D.

The inter-layer video encoding apparatus 10 may perform entropy encoding by transforming and quantizing an error, e.g., a residual according to inter-layer prediction, between a sample value of a second layer prediction block and a sample value of a second layer original block, by using a first layer reconstruction image. Also, entropy encoding may also be performed on an error between prediction information.

As described above, the inter-layer video encoding apparatus 10 may encode a current layer image sequence by referencing first layer reconstruction images through an inter-layer prediction structure. However, the inter-layer video encoding apparatus 10 according to some exemplary embodiments may encode a second layer image sequence according to a single layer prediction structure without having to reference other layer samples. Accordingly, the exemplary embodiments are not limited to the inter-layer video encoding apparatus 10 only performing inter prediction of an inter-layer prediction structure in order to encode a second layer image sequence.

Detailed operations of the inter-layer video encoding apparatus 10 that predicts a disparity vector for inter-layer prediction will now be described with reference to FIG. 1B. Hereinafter, a first layer image may denote a reference view image and a second layer image may denote a current view image to be encoded.

FIG. 1B is a flowchart of an inter-layer video encoding method according to an exemplary embodiment.

In operation 11, the disparity vector determiner 14 according to an exemplary embodiment may search for a neighboring block candidate having a motion vector in an inter-layer direction from among a spatial neighboring block candidate located at the left of a current block, a spatial neighboring block candidate located at the top of the current block, and temporal neighboring block candidates at co-located locations. According to an exemplary embodiment, the motion vector in the inter-layer direction of the neighboring block candidate may denote a disparity vector of the neighboring block candidate.

For example, the disparity vector determiner 14 may determine whether a neighboring block candidate at a co-located location from among a plurality of temporal neighboring block candidates has a motion vector in an inter-layer direction.

Also, the disparity vector determiner 14 may determine whether, from among a plurality of spatial neighboring block candidates, a spatial neighboring block candidate located lowest from blocks adjacent to a left boundary of a current block and a spatial neighboring block candidate located rightmost from blocks adjacent to a top boundary of the current block have a motion vector in an inter-layer direction.

Also, the disparity vector determiner 14 may omit searching for temporal and spatial neighboring candidates located in a diagonal direction of a current block from among pluralities of temporal and spatial neighboring block candidates.

However, if the disparity vector determiner 14 is unable to find a neighboring block candidate having a motion vector in an inter-layer direction from among the above-described neighboring block candidates, the disparity vector determiner 14 may search for a neighboring block candidate having a motion vector in an inter-layer direction from among spatial neighboring block candidates located at the bottom of a block located lowest from blocks adjacent to a left boundary of a current block, at top of a block located at the top from the blocks adjacent to the left boundary of the current block, and at right of a block located rightmost from blocks adjacent to a top boundary of the current block, and temporal neighboring block candidates located at bottom of a block located at bottom from blocks adjacent to a right boundary of a temporal co-located block of the current block.

In other words, the disparity vector determiner 14 may search for the neighboring block candidate having the motion vector in the inter-layer direction by prioritizing a spatial neighboring block candidate located at the left of the current block, a spatial neighboring block candidate located at the top of the current block, and temporal neighboring block candidates at co-located locations. According to an exemplary embodiment, the disparity vector determiner 14 may search for the neighboring block candidate having the motion vector in the inter-layer direction from among the temporal neighboring block candidates and then from among the spatial neighboring block candidates, but a searching order is not limited thereto.

When the number of reference pictures in a time direction, which are referenced to search temporal neighboring block candidates, is at least two, the disparity vector determiner 14 may search for a neighboring block candidate having a motion vector in an inter-layer direction by prioritizing a temporal neighboring block candidate included in a co-located picture.

For example, a random access point (RAP) picture may be searched after searching a co-located picture, or a picture that is closest to a current picture based on time may be searched. Alternatively, a neighboring block candidate at a co-located location may be searched from two pictures, and then other neighboring block candidates may be searched.

In operation 13, the disparity vector determiner 14 according to an exemplary embodiment may predict a motion vector in an inter-layer direction of a found neighboring block candidate as a disparity vector of the current block.

In operation 15, when a neighboring block candidate having a motion vector in an inter-layer direction is not found, the disparity vector determiner 14 according to an exemplary embodiment may search for a neighboring block candidate having disparity vector information from among neighboring block candidates. For example, if a neighboring block candidate has disparity vector information when the neighboring block candidate performed inter-layer motion prediction compensation, the disparity vector determiner 14 may search for a neighboring block candidate that performed inter-layer motion compensation from among neighboring block candidates.

Since an operation of the disparity vector determiner 14 searching for a spatial neighboring block candidate having disparity vector information is similar to an operation of searching for a spatial neighboring block having a motion vector in an inter-layer direction described above in operation 11, details thereof are not provided again.

In operation 17, the disparity vector determiner 14 according to an exemplary embodiment may predict the disparity vector of the current block by using disparity vector information of a found neighboring block candidate.

When a neighboring block candidate that performed inter-layer motion compensation is not found from among neighboring block candidates, the disparity vector determiner 14 may determine that a disparity vector is unable to be predicted from the neighboring block candidates, and determine the disparity vector to be a default disparity vector.

However, when a disparity vector is not predicted from neighboring blocks and a default disparity vector is set to be (0,0), a predicted disparity vector may not be accurate since a disparity is generated in most multiview images. Thus, the disparity vector determiner 14 may set the default disparity vector to a nonzero value to predict a disparity vector similar to an actual disparity vector.

Also, when a disparity vector is unable to be predicted from neighboring blocks, the disparity vector determiner 14 may set a default disparity vector to a nonzero value to use a mode that uses a disparity vector, such as a residual prediction mode.

A residual prediction mode is a mode in which a difference value between a motion vector value of a second layer current block and a motion vector value of a first layer reference block corresponding to the second layer current block is signaled. However, when a disparity vector is not predicted from neighboring blocks, prediction accuracy is low, and thus the residual prediction mode is not used. However, an inter-layer video decoding apparatus 20 according to an exemplary embodiment may use a mode of using a disparity vector by setting the disparity vector to a nonzero value.

Also, the disparity vector determiner 14 may re-set a disparity vector to a nonzero value even when the disparity vector predicted from neighboring blocks is (0,0).

Alternatively, since accuracy of a disparity vector is determined to be low when the disparity vector predicted from neighboring blocks is (0,0), the disparity vector determiner 14 may set a mode of using a disparity vector to be not used.

As described above, the inter-layer video encoding apparatus 10 increases accuracy of a predicted disparity vector, thereby increasing encoding efficiency.

The inter-layer video encoding apparatus 10 according to an exemplary embodiment may include a central processor (not shown) that generally controls the first layer encoder 12, the disparity vector determiner 14, and the second layer encoder 16. Alternatively, the first layer encoder 12, the disparity vector determiner 14, and the second layer encoder 16 may be operated by individual processors (not shown), and the inter-layer video encoding apparatus 10 may be operated as the individual processors systematically operate.

Alternatively, the first layer encoder 12, the disparity vector determiner 14, and the second layer encoder 16 may be controlled according to control of an external processor (not shown) of the inter-layer video encoding apparatus 10.

The inter-layer video encoding apparatus 10 may include at least one data storage unit in which input and output data of the first layer encoder 12, the disparity vector determiner 14, and the second layer encoder 16 is stored. The inter-layer video encoding apparatus 10 may include a memory controller that manages data input and output of the data storage unit.

In order to output a video encoding result, the inter-layer video encoding apparatus 10 may operate in cooperation with an internal video encoding processor installed therein or an external video encoding processor so as to perform video encoding operations including transformation. The internal video encoding processor of the inter-layer video encoding apparatus 10 may perform the video encoding operations as a separate processor. Also, basic video encoding operations may be realized as the inter-layer video encoding apparatus 10, a central processing apparatus, or a graphic processing apparatus includes a video encoding processing module.

Figure 2A:
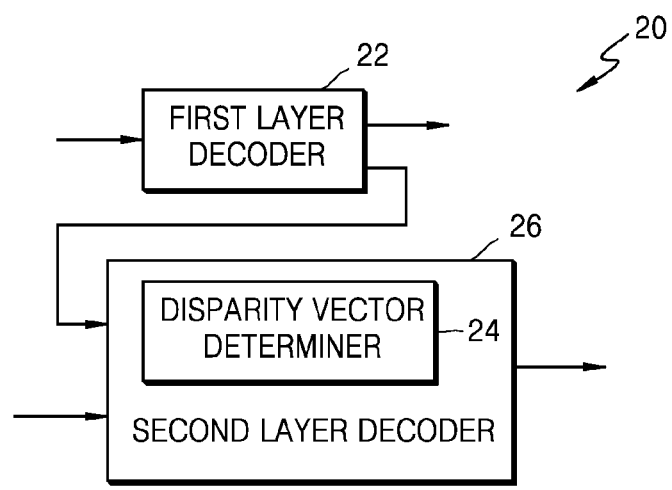
FIG. 2A is a block diagram of an inter-layer video decoding apparatus according to an exemplary embodiment.

FIG. 2A is a block diagram of an inter-layer video decoding apparatus according to an exemplary embodiment.

The inter-layer video decoding apparatus 20 according to an exemplary embodiment includes a first layer decoder 22, a disparity vector determiner 24, and a second layer decoder 26. The disparity vector determiner 24 may be included in the second layer decoder 26. The disparity vector determiner 24 according to another exemplary embodiment may be located outside the second layer decoder 26.

The inter-layer video decoding apparatus 20 according to an exemplary embodiment may receive bitstreams according to layers, via a scalable encoding method. The number of layers of bitstreams received by the inter-layer video decoding apparatus 20 is not limited. However, for convenience of description, an exemplary embodiment in which the first layer decoder 22 of the inter-layer video decoding apparatus 20 receives and decodes a first layer stream and the second layer decoder 26 receives and decodes a second layer stream will be described.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding method. When a stereoscopic video stream is received in a plurality of layers, a first layer stream may be decoded to reconstruct left view images. A second layer stream may be further decoded to reconstruct right view images.

Alternatively, when a multiview video stream is received in a plurality of layers, a first layer stream may be decoded to reconstruct central view images. A second layer stream may be further decoded to reconstruct left view images. A third layer stream may be further decoded to reconstruct right view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to first layer reconstruction images, second layer images may be further reconstructed. When a K-th layer stream is further decoded by referring to second layer reconstruction images, K-th layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and decode inter-layer predicted data between a plurality of layers. Reconstruction may be performed through motion compensation and inter-layer decoding based on a coding unit or a prediction unit.

Images may be reconstructed by performing motion compensation for a current image by referencing reconstruction images predicted via inter prediction of a same layer, with respect to each layer stream. Motion compensation is an operation in which a reconstruction image of a current image is reconstructed by composing a reference image determined by using a motion vector of the current image and a residual of the current image.

Also, the inter-layer video decoding apparatus 20 may perform inter-layer decoding by referring to prediction information of first layer images so as to decode a second layer image predicted via inter-layer prediction. Inter-layer decoding is an operation in which prediction information of a current image is reconstructed by using prediction information of a reference block of a different layer so as to determine the prediction information of the current image.

The inter-layer video decoding apparatus 20 according to an exemplary embodiment may perform inter-layer decoding for reconstructing third layer images predicted by referencing second layer images. An inter-layer prediction structure will be described later with reference to FIG. 3

However, the second layer decoder 26 according to an exemplary embodiment may decode a second layer stream without having to reference a first layer image sequence. Accordingly, the exemplary embodiments are not limited to the second layer decoder 26 performing inter-layer prediction to decode a second layer image sequence.

The inter-layer video decoding apparatus 20 performs decoding according to blocks of each image of a video. A block may be, from among coding units according to a tree structure, a maximum coding unit, a coding unit, a prediction unit, or a transformation unit.

The first layer decoder 22 may decode a first layer image by using parsed encoding symbols of the first layer image. When the inter-layer video decoding apparatus 20 receives streams encoded based on coding units of a tree structure, the first layer decoder 22 may perform decoding based on the coding units of the tree structure, according to a maximum coding unit of a first layer stream.

The first layer decoder 22 may obtain encoding information and encoded data by performing entropy decoding per maximum coding unit. The first layer decoder 22 may reconstruct a residual by performing inverse quantization and inverse transformation on encoded data obtained from a stream. The first layer decoder 22 according to another exemplary embodiment may directly receive a bitstream of quantized transformation coefficients. Residuals of images may be reconstructed by performing inverse quantization and inverse transformation on quantized transformation coefficients.

The first layer decoder 22 may determine a prediction image via motion compensation between same layer images, and reconstruct first layer images by combining the prediction image and a residual.

According to an inter-layer prediction structure, the second layer decoder 26 may generate a second layer prediction image by using samples of a first layer reconstruction image. The second layer decoder 26 may obtain a prediction error according to inter-layer prediction by decoding a second layer stream. The second layer decoder 26 may generate a second layer reconstruction image by combining a second layer prediction image and the prediction error.

The second layer decoder 26 may determine a second layer prediction image by using a first layer reconstruction image decoded by the first layer decoder 22. According to an inter-layer prediction structure, the second layer decoder 26 may determine a block of a first layer image, which is to be referenced by a block, such as a coding unit or a prediction unit, of a second layer image. For example, a reconstruction block of a first layer image, which is located in a location corresponding to a location of a current block in a second layer image, may be determined. The second layer decoder 26 may determine a second layer prediction block by using a first layer reconstruction block corresponding to a second layer block.

The second layer decoder 26 may use a second layer prediction block determined by using a first layer reconstruction block according to an inter-layer prediction structure, as a reference image for inter-layer prediction of a second layer original block. In this case, the second layer decoder 26 may reconstruct a second layer block by composing a sample value of a second layer prediction block determined by using a first layer reconstruction image and a residual according to inter-layer prediction.

When the inter-layer video decoding apparatus 20 described above decodes a multiview video, a first layer image to be encoded may be a first view video and a second layer image may be a second view video.

Since the views of a multiview image are obtained at the same time, similarity between images of views may be very high. Accordingly, encoding efficiency may be increased by performing disparity compensated prediction in which a region that is most similar to a block to be currently encoded is found and encoded from a different view image by using a disparity vector.

The inter-layer video decoding apparatus 20 may obtain a disparity vector for inter-layer prediction through a bitstream or predict the disparity vector from other pieces of encoding information.

For example, a disparity vector may be predicted from neighboring blocks of a block to be currently reconstructed. Also, when a disparity vector is unable to be predicted from neighboring blocks, a disparity vector may be set as a default disparity vector.

However, when the inter-layer video decoding apparatus 20 does not consider distances between a current block and neighboring blocks while searching for neighboring block candidates to determine a neighboring block to be used for disparity vector prediction, a neighboring block that is distant from the current block may have a search priority. In this case, a neighboring block candidate having low prediction accuracy due to a long distance may be determined as a neighboring block candidate to be used for disparity vector prediction, instead of a near neighboring block candidate having high prediction accuracy.

Thus, the inter-layer video decoding apparatus 20 according to an exemplary embodiment may perform disparity vector prediction by using neighboring block candidates near a current block, thereby providing a method of accurately predicting a disparity vector. Accordingly, by using the inter-layer video decoding apparatus 20, encoding efficiency may be increased, and in addition, processing operations may be simplified, thereby decreasing complexity of a decoding apparatus.

A method of determining, by the inter-layer video decoding apparatus 20, a disparity vector according to an exemplary embodiment, will be described in detail later with reference to FIGS. 4A through 7D.

According to a spatial scalable video coding method, when the first layer decoder 22 reconstructs a first layer image having different resolution from a second layer image, the second layer decoder 26 may interpolate a first layer reconstruction image so as to adjust a size of the first layer reconstruction image to the same resolution as a second layer original image. The interpolated first layer reconstruction image may be determined as a second layer prediction image for inter-layer prediction.

Accordingly, the first layer decoder 22 of the inter-layer video decoding apparatus 20 may reconstruct a first layer image sequence by decoding a first layer stream, and the second layer decoder 26 may reconstruct a second layer image sequence by decoding a second layer stream.

A detailed operation of the inter-layer video decoding apparatus 20 which determines a disparity vector for inter-layer prediction will now be described with reference to FIG. 2B. Hereinafter, a first layer image may denote a reference view image and a second layer image may denote a current view image to be decoded.

Figure 2B:
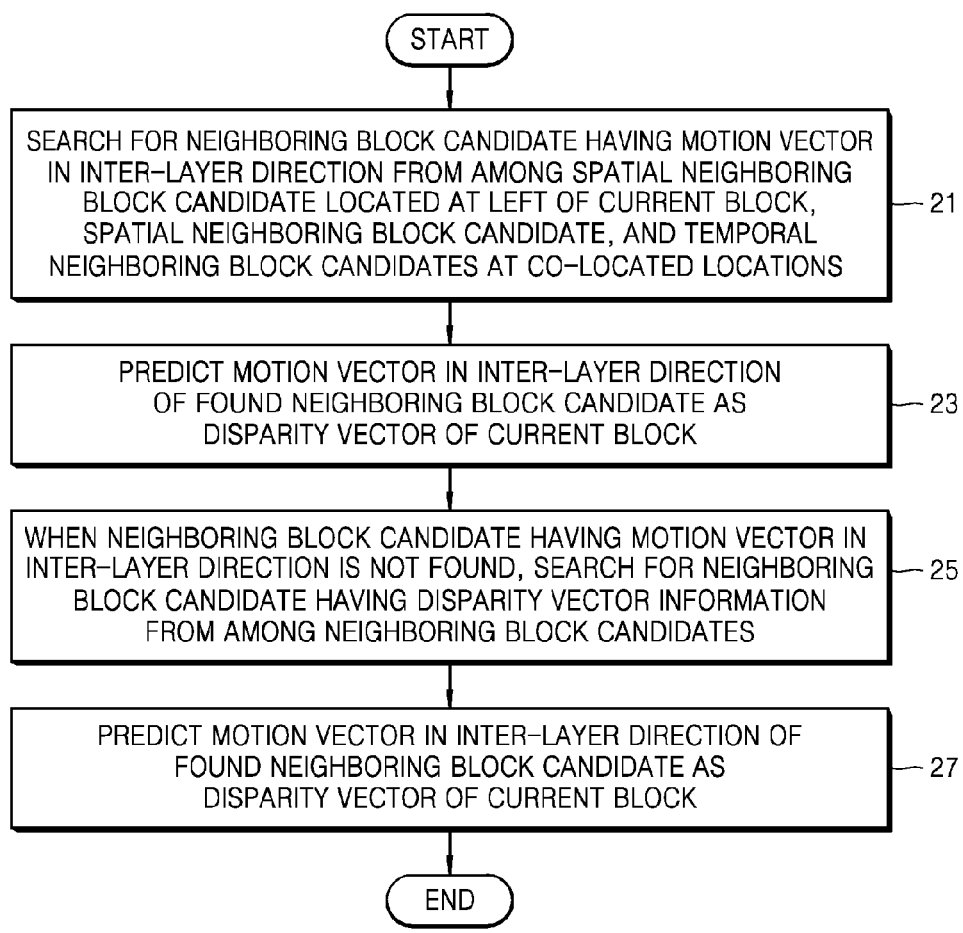
FIG. 2B is a flowchart of an inter-layer video decoding method according to an exemplary embodiment.

FIG. 2B is a flowchart of an inter-layer video decoding method according to an exemplary embodiment.

In operation 21, the disparity vector determiner 24 according to an exemplary embodiment may search for a neighboring block candidate having a motion vector in an inter-layer direction from among a spatial neighboring block candidate located at the left of a current block, a spatial neighboring block candidate located at the top of the current block, and temporal neighboring block candidates at co-located locations. According to an exemplary embodiment, a motion vector in an inter-layer direction of a neighboring block candidate may denote a disparity vector of the neighboring block candidate.

For example, the disparity vector determiner 24 may determine whether a neighboring block candidate at a co-located location has a motion vector in an inter-layer direction from among a plurality of temporal neighboring block candidates.

Also, the disparity vector determiner 24 may determine whether, from among a plurality of spatial neighboring block candidates, a spatial neighboring block candidate located lowest from blocks adjacent to a left boundary of a current block and a spatial neighboring block candidate located rightmost from blocks adjacent to a top boundary of the current block have a motion vector in an inter-layer direction.

Also, the disparity vector determiner 24 may omit searching for temporal and spatial neighboring candidates located in a diagonal direction of a current block from among pluralities of temporal and spatial neighboring block candidates.

However, if the disparity vector determiner 14 is unable to find a neighboring block candidate having a motion vector in an inter-layer direction from among the above-described neighboring block candidates, the disparity vector determiner 24 may search for a neighboring block candidate having a motion vector in an inter-layer direction from among spatial neighboring block candidates located at the bottom of a block located lowest from blocks adjacent to a left boundary of a current block, at the top of a block located at the top from the blocks adjacent to the left boundary of the current block, and at right of a block located rightmost from blocks adjacent to a top boundary of the current block, and temporal neighboring block candidates located at the bottom of a block located at the bottom from blocks adjacent to a right boundary of a temporal co-located block of the current block.

In other words, the disparity vector determiner 24 may search for the neighboring block candidate having the motion vector in the inter-layer direction by prioritizing a spatial neighboring block candidate located at the left of the current block, a spatial neighboring block candidate located at the top of the current block, and temporal neighboring block candidates at co-located locations. According to an exemplary embodiment, the disparity vector determiner 24 may search for the neighboring block candidate having the motion vector in the inter-layer direction from among the temporal neighboring block candidates and then from among the spatial neighboring block candidates, but a searching order is not limited thereto.

When the number of reference pictures in a time direction, which are referenced to search temporal neighboring block candidates, is at least two, the disparity vector determiner 24 may search for a neighboring block candidate having a motion vector in an inter-layer direction by prioritizing a temporal neighboring block candidate included in a co-located picture.

For example, an RAP picture may be searched after searching a co-located picture, or a picture that is closest to a current picture based on time may be searched. Alternatively, a neighboring block candidate at a co-located location may be searched from two pictures, and then other neighboring block candidates may be searched.

In operation 23, the disparity vector determiner 24 according to an exemplary embodiment may predict a motion vector in an inter-layer direction of a found neighboring block candidate as a disparity vector of the current block.

In operation 25, when a neighboring block candidate having a motion vector in an inter-layer direction is not found, the disparity vector determiner 24 according to some exemplary embodiments may search for a neighboring block candidate having disparity vector information from among neighboring block candidates. For example, if a neighboring block candidate has disparity vector information when the neighboring block candidate is used to perform inter-layer motion prediction compensation, the disparity vector determiner 24 may search for a neighboring block candidate that is used to perform inter-layer motion compensation from among neighboring block candidates.

Since an operation of the disparity vector determiner 24 searching for a spatial neighboring block candidate having disparity vector information is similar to an operation of searching for a spatial neighboring block having a motion vector in an inter-layer direction described above in operation 21, details thereof are not provided again.

In operation 27, the disparity vector determiner 24 according to an exemplary embodiment may predict the disparity vector of the current block by using disparity vector information of a found neighboring block candidate.

When a neighboring block candidate that is used to perform inter-layer motion compensation is not found from among neighboring block candidates, the disparity vector determiner 24 may determine that a disparity vector is unable to be predicted from the neighboring block candidates, and determine the disparity vector to be a default disparity vector.

However, when a disparity vector is not predicted from neighboring blocks and a default disparity vector is set to be (0,0), a predicted disparity vector may not be accurate since a disparity is generated in most multiview images. Thus, the disparity vector determiner 24 may set the default disparity vector to a nonzero value such as to predict a disparity vector similar to an actual disparity vector.

Also, when a disparity vector is unable to be predicted from neighboring blocks, the disparity vector determiner 24 may set a default disparity vector to a nonzero value to use a mode that uses a disparity vector, such as a residual prediction mode.

Also, the disparity vector determiner 24 may re-set a disparity vector to a nonzero value even when the disparity vector predicted from neighboring blocks is (0,0).

Alternatively, since accuracy of a disparity vector is determined to be low when the disparity vector predicted from neighboring blocks is (0,0), the disparity vector determiner 24 may set a mode of using a disparity vector to be not used.

As described above, the inter-layer video decoding apparatus 20 increases accuracy of a predicted disparity vector, thereby increasing encoding efficiency.

The inter-layer video decoding apparatus 20 according to an exemplary embodiment may include a central processor (not shown) that generally controls the first layer decoder 22, the disparity vector determiner 24, and the second layer decoder 26. Alternatively, the first layer decoder 22, the disparity vector determiner 24, and the second layer decoder 26 may be operated by individual processors (not shown), and the inter-layer video decoding apparatus 20 may be operated as the individual processors systematically operate. Alternatively, the first layer decoder 22, the disparity vector determiner 24, and the second layer decoder 26 may be controlled according to control of an external processor of the inter-layer video decoding apparatus 20.

The inter-layer video decoding apparatus 20 according to an exemplary embodiment may include at least one data storage unit in which input and output data of the first layer decoder 22, the disparity vector determiner 24, and the second layer decoder 26 is stored. The inter-layer video decoding apparatus 20 may include a memory controller that manages data input and output of the data storage unit.

In order to reconstruct a video via video decoding, the inter-layer video decoding apparatus 20 according to an exemplary embodiment may operate in cooperation with an internal video encoding processor installed therein or an external video encoding processor so as to perform video decoding operations including transformation. The internal video encoding processor of the multi-layer video decoding apparatus 20 according to an exemplary embodiment may be a separate processor, or alternatively, the inter-layer video decoding apparatus 20, a central processing apparatus, or a graphic processing apparatus may include a video decoding processing module to perform basic video decoding operations.

Hereinafter, an inter-layer prediction structure that may be used in the inter-layer video encoding apparatus 10 according to an exemplary embodiment will be described with reference to FIG. 3.

Figure 3:
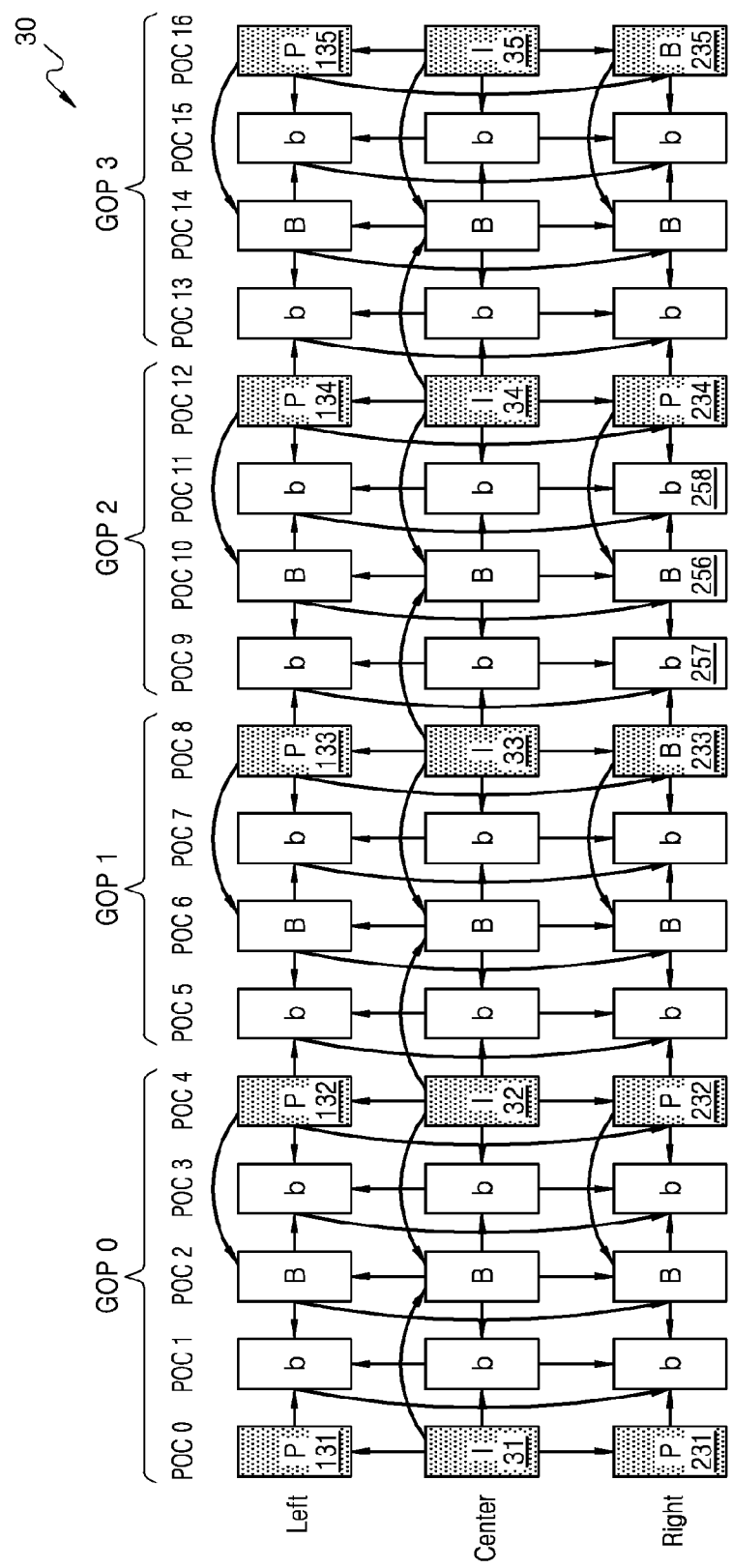
FIG. 3 is a diagram of an inter-layer prediction structure which may be used according to an exemplary embodiment.

FIG. 3 is a diagram of an inter-layer prediction structure according to an exemplary embodiment.

The inter-layer video encoding apparatus 10 according to an exemplary embodiment may prediction-encode base view images, left view images, and right view images according to a reproduction order 30 of a multiview video prediction structure of FIG. 3.

According to the reproduction order 30 of the multiview video prediction structure according to a related technology, images of the same view are arranged in a horizontal direction. Accordingly, the left view images indicated by 'Left' are arranged in the horizontal direction in a row, the base view images indicated by 'Center' are arranged in the horizontal direction in a row, and the right view images indicated by 'Right' are arranged in the horizontal direction in a row. Compared to the left/right view images, the base view images may be central view images.

Also, images having the same POC order are arranged in a vertical direction. A POC order of images indicates a reproduction order of images forming a video. 'POC X' indicated in the reproduction order 30 of the multiview video prediction structure indicates a relative reproduction order of images in a corresponding column, wherein a reproduction order is in front when a value of X is low, and is behind when the value of X is high.

Thus, according to the reproduction order 30 of the multiview video prediction structure according to the related technology, the left view images indicated by 'Left' are arranged in the horizontal direction according to the POC order (reproduction order), the base view images indicated by 'Center' are arranged in the horizontal direction according to the POC order (reproduction order), and the right view images indicated by 'Right' are arranged in the horizontal direction according to the POC order (reproduction order). Also, the left view image and the right view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, e.g., a POC order, while reproducing a video, an anchor picture closest to the reproduction location according to the POC order is reproduced. The base layer images include base layer anchor pictures 31 through 35, the left view images include left view anchor pictures 131 through 135, and the right view images include right view anchor pictures 231 through 235.

Multiview images may be reproduced and predicted (reconstructed) according to a GOP order. First, according to the reproduction order 30 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 1 may be predicted (reconstructed), and then the images included in GOP 1 may be predicted (reconstructed), according to views. In other words, the images included in each GOP may be predicted (reconstructed) in an order of GOP 0, GOP 1, GOP 2, and GOP 3.

According to the reproduction order 30 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base view images may be encoded and then output in a form of a base view image stream, and a prediction result of additional view images may be encoded and then output in a form of a layer bitstream. Also, a prediction encoding result of left view images may be output as a first layer bitstream, and a prediction encoding result of right view images may be output as a second layer bitstream.

Only inter-prediction is performed on base view images. In other words, the base layer anchor pictures 31 through 35 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references the same view images are performed on each of left view images and right view images.

Inter-view prediction (inter-layer prediction) may be performed on the left view anchor pictures 131 through 135 by respectively referring to the base view anchor pictures 31 through 35 having the same POC order. Inter-view prediction may be performed on the right view anchor pictures 231 through 235 by respectively referring to the base view anchor pictures 31 through 35 or the left view anchor pictures 131 through 135 having the same POC order. Also, inter-view prediction (inter-layer prediction) may be performed on remaining images other than the left view images 131 through 135 and the right view images 231 through 235 by referring to other view images having the same POC.

Remaining images other than the anchor pictures 131 through 135 and 231 through 235 from among left view images and right view images are predicted by referring to the same view images.

However, each of the left view images and the right view images may not be predicted by referring to an anchor picture that has a preceding reproduction order from among additional view images of the same view. In other words, in order to perform inter prediction on a current left view image, left view images excluding a left view anchor picture that precedes the current left view image in a reproduction order may be referenced. Similarly, in order to perform inter prediction on a current right view image, right view images excluding a right view anchor picture that precedes the current right view image in a reproduction order may be referenced.

Also, in order to perform inter prediction on a current left view image, prediction may be performed by referring to a left view image that belongs to a current GOP but is to be reconstructed before the current left view image, instead of referring to a left view image that belongs to a GOP before the current GOP of the current left view image. The same prediction technique is applied to a right view image.

The inter-layer video decoding apparatus 20 according to an exemplary embodiment may reconstruct base view images, left view images, and right view images according to the reproduction order 30 of the multiview video prediction structure of FIG. 3.

Left view images may be reconstructed via inter-view disparity compensation that references base view images and inter motion compensation that references left view images. Right view images may be reconstructed via inter-view disparity compensation that references base view images and left view images, and inter motion compensation that references right view images. Reference images may be reconstructed first for disparity compensation and motion compensation of left view images and right view images.

For inter motion compensation of a left view image, left view images may be reconstructed via inter motion compensation that references a reconstructed left view reference image. For inter motion compensation of a right view image, right view images may be reconstructed via inter motion compensation that references a reconstructed right view reference image.

Also, for inter motion compensation of a current left view image, only a left view image that belongs to a current GOP of the current left view image but is to be reconstructed before the current left view image may be referenced, and a left view image that belongs to a GOP before the current GOP is not referenced. The same inter motion compensation technique is applied to a right view image.

Also, the inter-layer video decoding apparatus 20 according to an exemplary embodiment may not only perform disparity compensation (or inter-layer prediction compensation) to encode or decode a multiview image, but also perform motion compensation between images (or inter-layer motion prediction compensation) via inter-view motion vector prediction.

Inter-layer disparity compensation and inter-layer motion vector prediction compensation will now be described with reference to FIG. 4A.

Figure 4A:
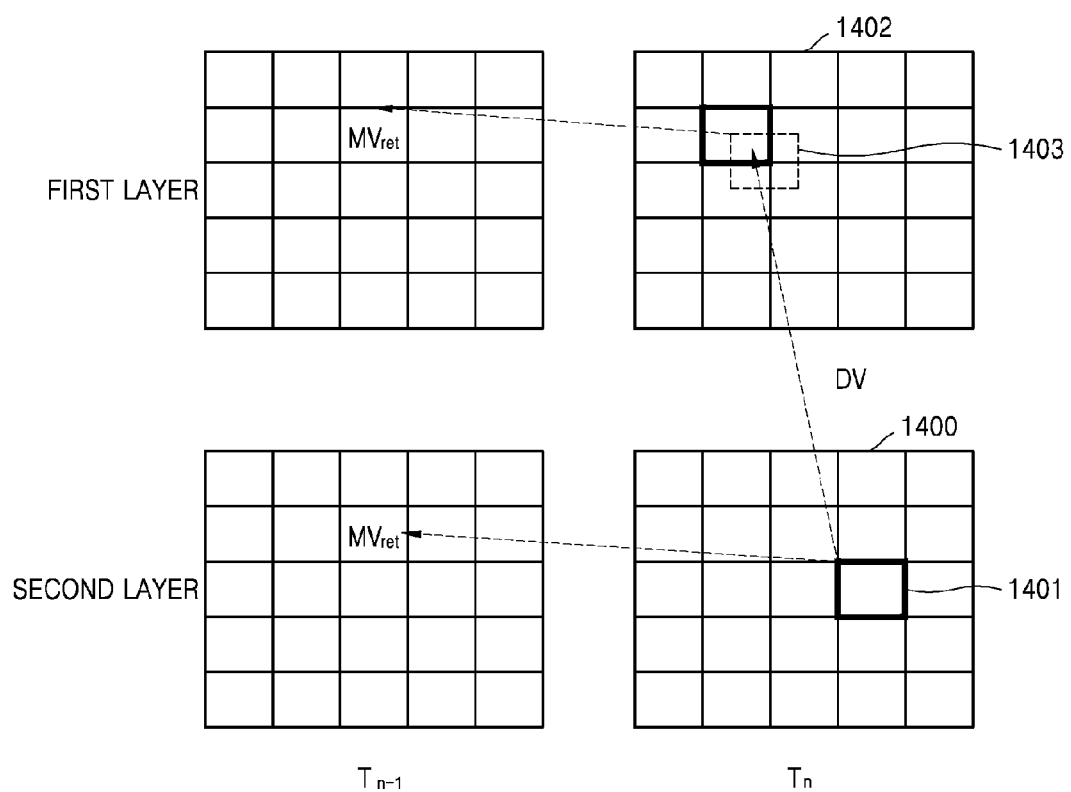
FIG. 4A is a diagram for describing a disparity vector for inter-layer prediction, according to an exemplary embodiment.

FIG. 4A is a diagram for describing a disparity vector for inter-layer prediction, according to an exemplary embodiments.

Referring to FIG. 4A, the inter-layer video decoding apparatus 20 according to an exemplary embodiment may perform inter-layer prediction to find a first layer reference block 1403 included in a first layer reference picture 1402, which corresponds to a current block 1401 included in a second layer current picture 1400, by using a disparity vector DV, and perform disparity compensation by using the first layer reference block 1403.

Also, the inter-layer video decoding apparatus 20 according to an exemplary embodiment may, for inter-layer motion prediction compensation, obtain a reference motion vector mv_ref of the first layer reference block 1403 indicated by the disparity vector DV from the second layer current block 1401 and predict a motion vector mv_cur of the current block 1401 by using the obtained reference motion vector mv_ref. In this case, the inter-layer video decoding apparatus 20 may perform motion compensation between second layer images by using the predicted motion vector mv_cur. According to an exemplary embodiment, a reference location may be a location indicated by the disparity vector DV from a center pixel of the current block 1401, or a location indicated by the disparity vector DV from an upper left pixel of the current block 1401.

As described above, in order to perform compensation prediction by referring to different view images, a disparity vector may be required. A disparity vector may be transmitted from an encoding apparatus to a decoding apparatus through a bitstream as separate information, or may be predicted based on a depth image or a block.

Figure 4B:
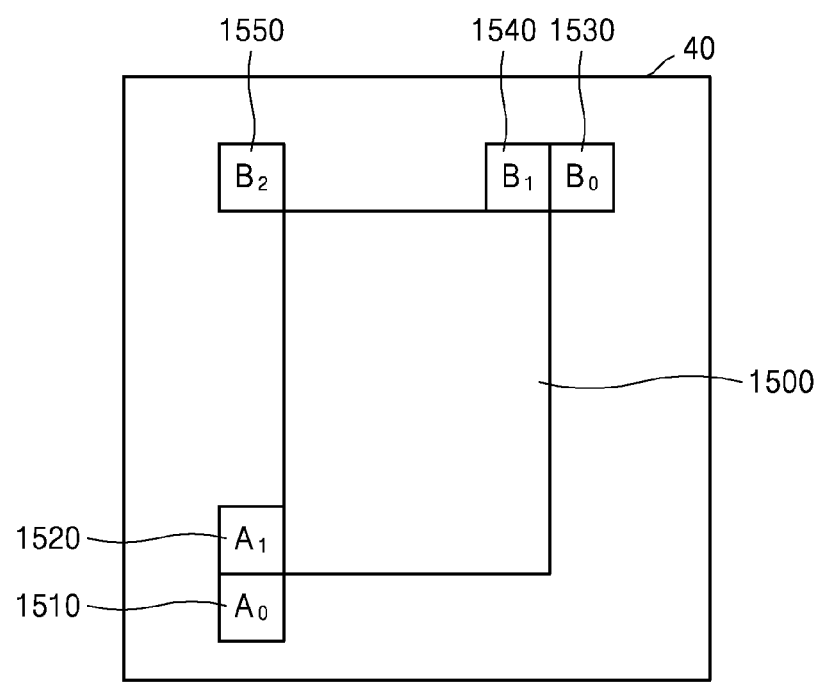
FIG. 4B illustrates spatial neighboring block candidates for predicting a disparity vector, according to an exemplary embodiment.

For example, FIG. 4B illustrates an example of predicting a disparity vector by using spatial neighboring block candidates, according to an exemplary embodiment.

Referring to FIG. 4B, the inter-layer decoding apparatus 20 may search spatial neighboring block candidates in a certain searching order (for example, z-scan or raster scan) in order to predict a disparity vector of a current block 1500 in a current image 40. According to an exemplary embodiment, found neighboring block candidates may be prediction units temporally or spatially adjacent to the current block 1500.

For example, a neighboring block A0 1510 located at the left bottom of the current block 1500, a neighboring block A1 1520 located at the left of the current block 1500, a neighboring block B0 1530 located at right top of the current block 1500, a neighboring block B1 1540 located at the top of the current block 1500, and a neighboring block B2 1550 located at the left top of the current block 1500 may be spatial neighboring block candidates for obtaining a disparity vector. In order to obtain a disparity vector, neighboring blocks at certain locations may be searched in an order of neighboring block candidates A1 1520, B1 1540, B0 1530, A0 1510, and B2 1550.

As another example, locations of the neighboring block candidates A1 1520, B1 1540, B0 1530, A0 1510, and B2 1550 of FIG. 4B may be defined as shown in Table 1 below.

According to a related art method, in order to predict a disparity vector, the inter-layer video decoding apparatus 20 may search spatial and temporal neighboring block candidates in a pre-determined order (for example, a right bottom block BR of a co-located picture→a co-located block Col of the co-located picture→a right bottom block BR of an RAP picture→a co-located block Col of the RAP picture→a neighboring block A1 located at the left of a current block→a neighboring block B1 located at the top of the current block→a neighboring block B0 located to right top in a diagonal direction of the current block→a neighboring block A0 located at the left bottom in the diagonal direction of the current block→a neighboring block B2 located at the left top in the diagonal direction of the current block) to determine whether one of the spatial and temporal neighboring block candidates has a motion vector in an inter-layer direction. Also, a motion vector in an inter-layer direction, which is obtained first according to a searching order, may be predicted as a disparity vector of the current block.

If a block on which disparity compensation is performed does not exist, the inter-layer video decoding apparatus 20 determines whether there is a block that performed inter-layer motion prediction compensation from among the spatial neighboring blocks A1, B1, B0, A0, and B2. The inter-layer decoding apparatus 20 may search for a neighboring block that performed inter-layer motion prediction compensation according to a pre-determined order (for example, the neighboring block A1 located at the left of the current block→the neighboring block B1 located at the top of the current block→the neighboring block B0 located at right top in the diagonal direction of the current block→the neighboring block A0 located at the left bottom in the

TABLE 1

| | $A_1$ | $B_1$ | $B_0$ | $A_0$ | $B_2$ |
|---|---|---|---|---|---|
| xN | xPb − 1 | xPb + nPbW − 1 | xPb + nPbW | xPb − 1 | xPb − 1 |
| yN | yPb + nPbH − 1 | yPb − 1 | yPb − 1 | yPb + nPbH | yPb − 1 |

In Table 1, (xPb, yPb) may denote a location of a current block, nPbW and nPbH may respectively denote a width and a height of the current block, and (xN, yN) may denote a location of the neighboring blocks A1, B1, B0, A0, and B2.

The inter-layer decoding apparatus 20 may predict a disparity vector of a current block by using a disparity vector (motion vector in an inter-layer direction) when the disparity vector is obtained from neighboring block candidates.

Figure 4C:
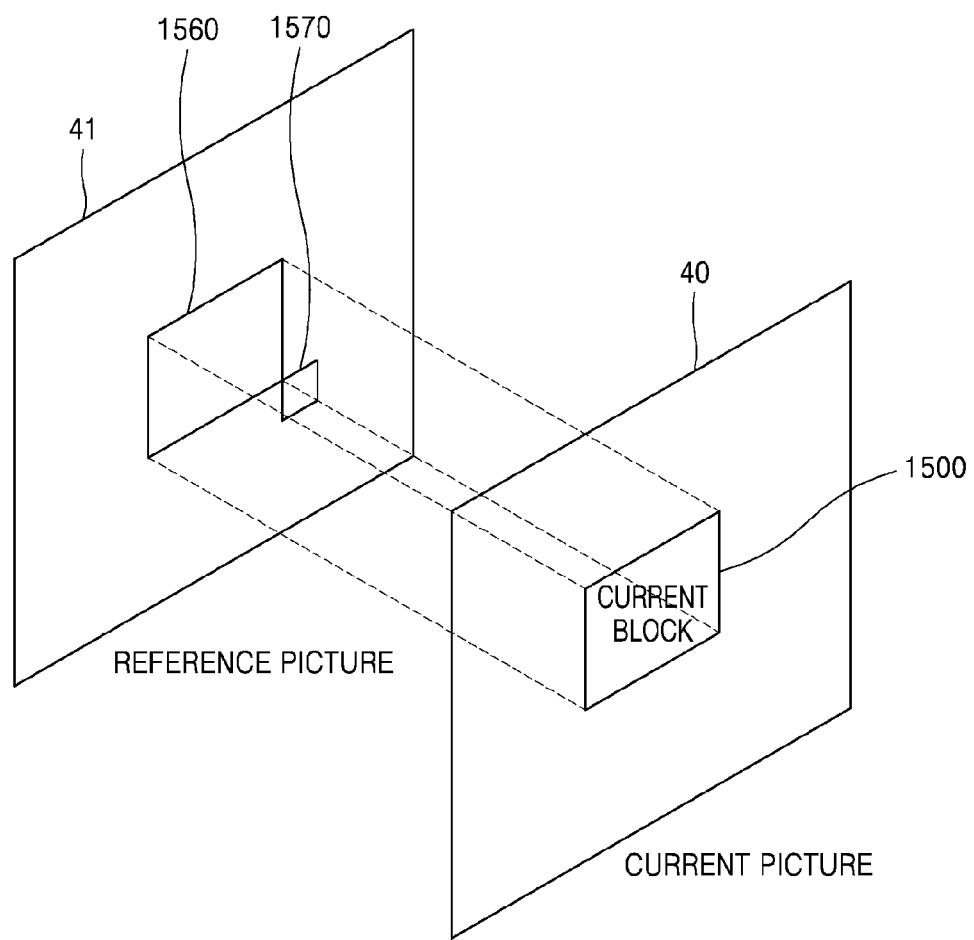
FIG. 4C illustrates a spatial neighboring block candidate for predicting a disparity vector, according to an exemplary embodiment.

FIG. 4C illustrates a spatial neighboring block candidate for predicting a disparity vector, according to an exemplary embodiment.

Referring to FIG. 4C, in order for the inter-layer video decoding apparatus 20 to perform inter prediction on the current block 1500 included in the current image 40, at least one of a block Col 1560 that is included in a reference picture 41 and is co-located with the current block 1500 and an adjacent block of the co-located block 1560 may be included in a temporal neighboring block candidate. For example, a right bottom block BR 1570 of the co-located block Col 1560 may be included in a temporal prediction candidate. A block used for a temporal prediction candidate determination may be a coding unit or a prediction unit.

Also, here, the reference picture 41 may be a co-located picture, a picture closest to a reference list, or a picture having a smallest index in the reference list. Alternatively, the reference picture 41 may be a picture having a highest level from a current reference list based on a hierarchical prediction structure. Alternatively, the reference picture 41 may be a random access point (RAP) picture.

diagonal direction of the current block→the neighboring block B2 located at the left top in the diagonal direction of the current block), and predict the disparity vector of the current block 1500 by obtaining disparity vector information from a found neighboring block candidate.

However, when the inter-layer video decoding apparatus 20 does not consider a distance between a current block and neighboring blocks while searching for a neighboring block candidate to determine a neighboring block to be used for disparity vector prediction, a neighboring block candidate having low prediction accuracy due to a long distance between the current block and the neighboring block may be determined as the neighboring block to be used for disparity vector prediction instead of a close neighboring block candidate having high prediction accuracy.

Accordingly, a method of accurately predicting a disparity vector as the inter-layer video encoding apparatus 10 or decoding apparatus 20 according to some exemplary embodiments performs disparity vector prediction by using neighboring block candidates close to a current block, as will now be described with reference to FIGS. 5 through 7D and syntax elements.

Figure 5:
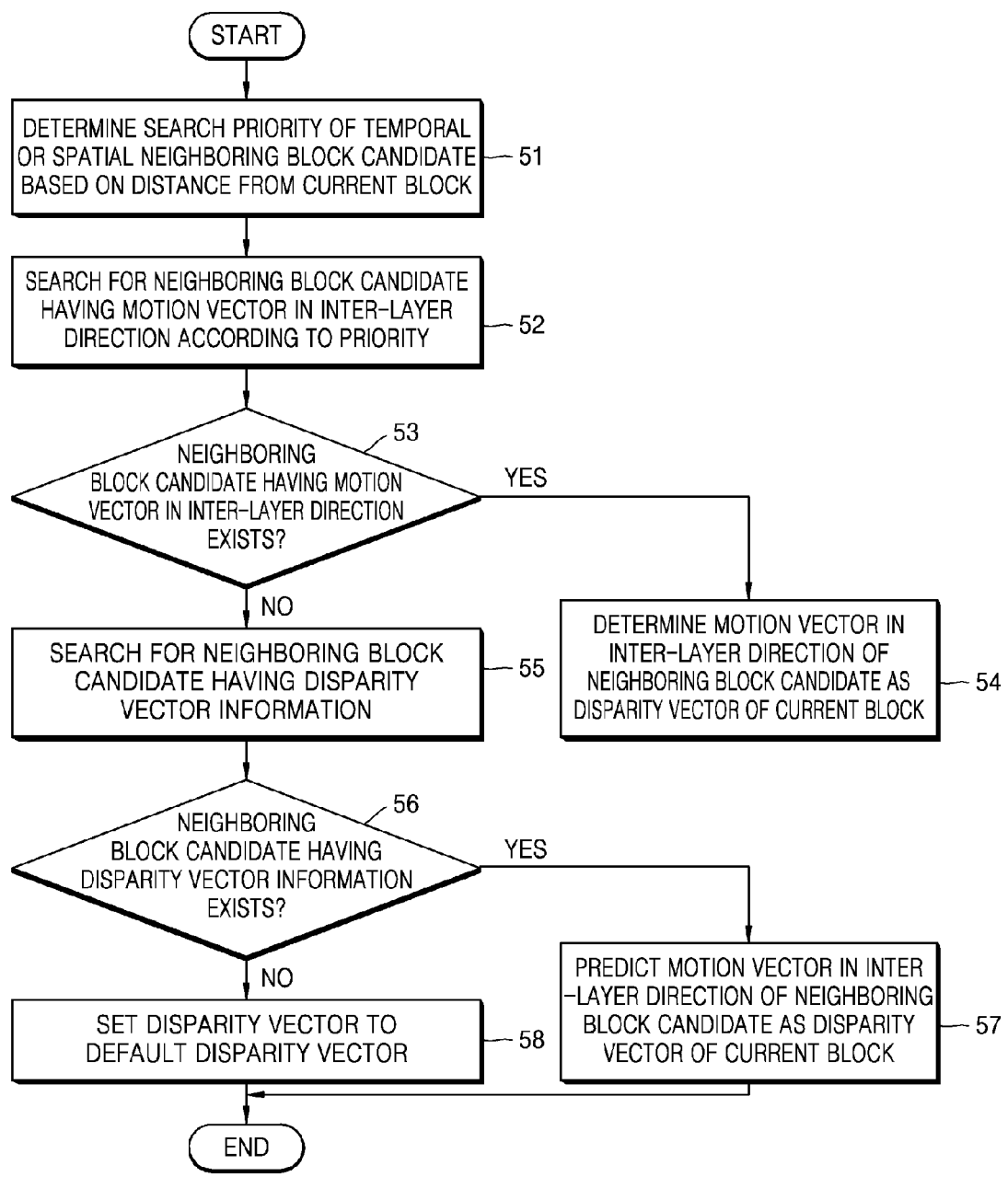
FIG. 5 is a flowchart of a method of predicting a disparity vector based on blocks, according to an exemplary embodiment.

FIG. 5 is a flowchart of a method of predicting a disparity vector based on blocks, according to an exemplary embodiment.

In operation 51, the inter-layer video decoding apparatus 20 according to an exemplary embodiment determines a search priority of a temporal or spatial neighboring block candidate based on a distance from a current block.

The inter-layer video decoding apparatus 20 may determine neighboring block candidates close to the current block as neighboring block candidates having high priorities, and remaining block candidates relatively far from the current block as neighboring block candidates having low search priorities.

Accordingly, the inter-layer video decoding apparatus 20 may first search for the close neighboring block candidates having a disparity vector and then search for the remaining neighboring block candidates having a disparity vector.

For example, a searching order may be determined according to combinations disclosed below.

Combination (1): Search close temporal neighboring block candidate(s)→search close spatial neighboring block candidate(s)→search remaining temporal neighboring block candidate(s)→search remaining spatial neighboring block candidate(s)

Combination (2): Search close spatial neighboring block candidate(s)→search close temporal neighboring block candidate(s)→search remaining spatial neighboring block candidate(s)→search remaining temporal neighboring block candidate(s)

Combination (3): Search close spatial neighboring block candidate(s)→search remaining spatial neighboring block candidate(s)→search close temporal neighboring block candidate(s)→search remaining temporal neighboring block candidate(s)

Combination (4): Search close temporal neighboring block candidate(s)→search remaining temporal neighboring block candidate(s)→search close spatial neighboring block candidate(s)→search remaining spatial neighboring block candidate(s)

According to an exemplary embodiment, the close neighboring block candidates may include the spatial neighboring block candidate A1 located at the left of the current block, a spatial neighboring block candidate B1 located at the top of the current block, and a temporal neighboring block candidate Col at a co-located location.

Of course, the searching order is not limited to the above exemplary searching orders, and may be changed within a range in which a neighboring block candidate close to the current block has priority.

When there are at least two reference pictures in a time direction, which are to be referenced to search for a temporal neighboring block candidate, the inter-layer video decoding apparatus 20 may search a neighboring block candidate having a motion vector in an inter-layer direction by prioritizing a temporal neighboring block candidate included in a co-located picture.

For example, the inter-layer video decoding apparatus 20 may search for a temporal neighboring block candidate according to combinations disclosed below.

Combination (1): Co-located block Col of co-located picture→Co-located block Col of RAP picture→right bottom block BR of co-located picture→right bottom block BR of RAP picture Combination (2): Co-located block Col of co-located picture→right bottom block BR of co-located picture→co-located block Col of RAP picture→right bottom block of RAP picture In other words, a RAP picture may be searched after searching a co-located picture or a picture closest to a current picture based on time may be searched first. Also, a neighboring block candidate at a co-located location may be searched for first from two pictures and then other neighboring block candidates may be searched for. A picture closest to a current picture based on a time may be a picture having a POC value closest to the current picture.

In operation 52, the inter-layer video decoding apparatus 20 may search for a neighboring block candidate having a motion vector in an inter-layer direction according to the determined priority.

In operation 53, the inter-layer video decoding apparatus 20 may determine whether a neighboring block candidate having a motion vector in an inter-layer direction exists.

When the neighboring block candidate having the motion vector in the inter-layer direction exists, the inter-layer video decoding apparatus 20 may predict the motion vector in the inter-layer direction of the neighboring block candidate as a disparity vector of a current block in operation 54.

On the other hand, when the neighboring block candidate having the motion vector in the inter-layer direction does not exist, the inter-layer video decoding apparatus 20 may search for a neighboring block candidate having disparity vector information in operation 55.

For example, the inter-layer video decoding apparatus 20 may determine whether the neighboring block candidate having the disparity vector information exists from the spatial or temporal neighboring block candidates according to the search priority determined in operation 51.

In operation 56, the inter-layer video decoding apparatus 20 determines whether the neighboring block candidate having the disparity vector information exists (e.g., is found), and if found, may predict the disparity vector of the current block by using the disparity vector information of the neighboring block candidate in operation 57.

On the other hand, when the neighboring block candidate having the motion vector in the inter-layer direction does not exist, the inter-layer video decoding apparatus 20 may set the disparity vector to a default disparity vector in operation 58.

Figure 6A:
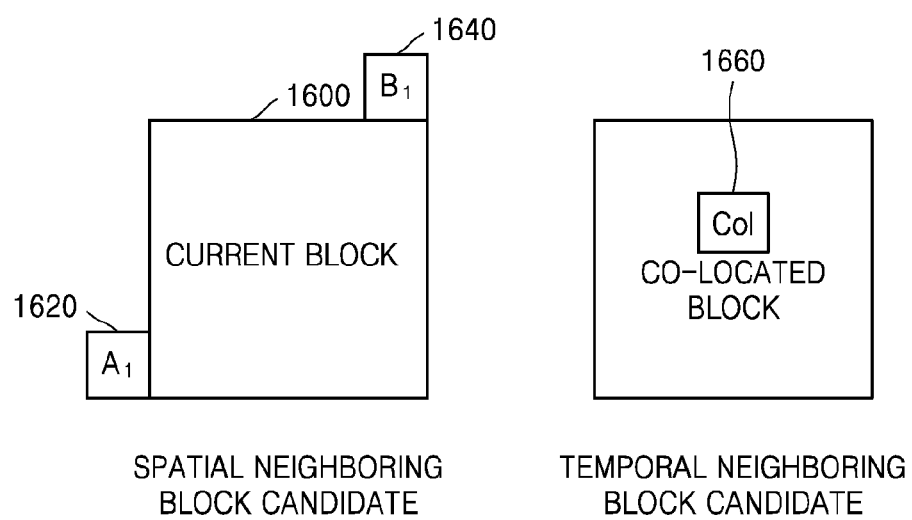
FIG. 6A illustrates spatial and temporal neighboring block candidates for predicting a disparity vector, according to an exemplary embodiment.

FIG. 6A illustrates spatial and temporal neighboring block candidates for predicting a disparity vector, according to an exemplary embodiment.

Referring to FIG. 6A, the inter-layer video decoding apparatus 20 according to an exemplary embodiment may only use a spatial neighboring block candidate A1 1620 located at the left of a current block 1600, a spatial neighboring block candidate B1 1640 located at the top of the current block 1600, and a temporal neighboring block candidate Col 1660 located at a co-located location as spatial and temporal neighboring block candidates for predicting a disparity vector.

In other words, the inter-layer video decoding apparatus 20 may omit searching temporal and spatial neighboring block candidates A0, B0, B2, and BR in a diagonal direction of the current block from among pluralities of temporal and spatial neighboring block candidates.

Figure 6B:
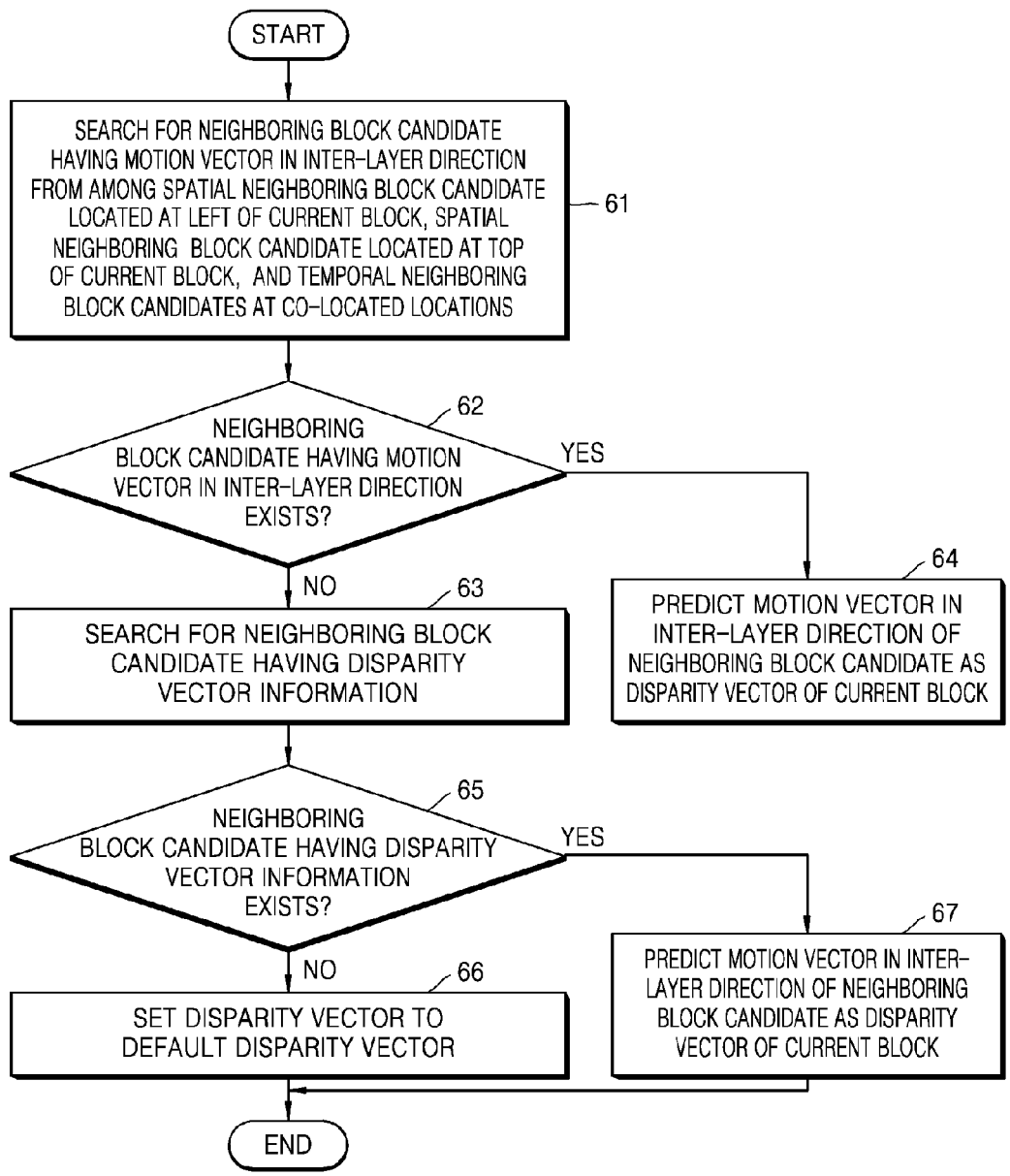
FIG. 6B is a flowchart of a method of predicting a disparity vector based on blocks, according to an exemplary embodiment.

For example, FIG. 6B is a flowchart of a method of predicting a disparity vector based on blocks, according to an exemplary embodiment.

In operation 61, the inter-layer video decoding apparatus 20 may search for a neighboring block candidate having a motion vector in an inter-layer direction from among a spatial neighboring block candidate located at the left of a current block, a spatial neighboring block candidate located at the top of the current block, and temporal neighboring block candidates at co-located locations. According to an exemplary embodiment, a motion vector in an inter-layer direction of a neighboring block candidate may denote a disparity vector of the neighboring block candidate.

For example, the inter-layer video decoding apparatus 20 may search neighboring block candidates in a following order.

Co-located block candidate Col of co-located picture→co-located block candidate of RAP picture→spatial neighboring block candidate A1 located at the left of current block→spatial neighboring block candidate A2 located at the top of current block In operation 62, the inter-layer video decoding apparatus 20 may determine whether a neighboring block candidate having a motion vector in an inter-layer direction exists.

When the neighboring block candidate having the motion vector in the inter-layer direction exists, the inter-layer video decoding apparatus 20 may predict the motion vector in the inter-layer direction of the neighboring block candidate as a disparity vector of a current block in operation 64.

On the other hand, when the neighboring block candidate having the motion vector in the inter-layer direction does not exist, the inter-layer video decoding apparatus 20 may search for a neighboring block candidate having disparity vector information in operation 63.

For example, the inter-layer video decoding apparatus 20 may determine whether the neighboring block candidate having the disparity vector information exists from among the spatial neighboring block candidate A1 located at the left of the current block and the spatial neighboring block B1 located at the top of the current block.

In operation 65, the inter-layer video decoding apparatus 20 determines whether the neighboring block candidate having the disparity vector information is found, and if found, may predict the disparity vector of the current block by using the disparity vector information of the neighboring block candidate in operation 67.

On the other hand, when the neighboring block candidate having the motion vector in the inter-layer direction does not exist, the inter-layer video decoding apparatus 20 may set the disparity vector to a default disparity vector in operation 66.

As described above, the inter-layer video decoding apparatus 20 performs disparity vector prediction by using neighboring block candidates near a current block, thereby providing a method of accurately predicting a disparity vector. Accordingly, the inter-layer video decoding apparatus 20 may have high encoding efficiency, and in addition, have simplified process operations, thereby reducing complexity of a decoding apparatus.

According to some exemplary embodiments, details described above with reference to FIGS. 6A through 6B may be realized according to the following exemplary embodiments.

In a method of predicting, by the inter-layer video decoding apparatus 20, a disparity vector based on neighboring blocks, according to some exemplary embodiments, inputs are a location (xCb, yCb) of a current block in a current picture and nCbS that is a width or height size of the current block. According to an exemplary embodiment, a location of a current block may be indicated by a location of a left top sample of the current block.

First, a flag (dvAvailFlag) which indicates whether a disparity vector is predictable and a disparity vector (mvDsip) are set to 0.

Also, a variable checkParallelMergeFlag related to a parallel process is derived as follows. In detail, checkParallelMergeFlag is set to 1 when at least one of the following conditions is satisfied, and is set to 0 in other cases.

When a prediction mode (CuPredMode[xCb][yCb]) of a current block is a skip mode (MODE_SKIP)

When a prediction mode of a current block is an inter-mode (MODE_INTER) and MergeFlag[xCb][yCb] is 1

Then, it is determined whether a disparity vector is predictable by using temporal neighboring block candidates. According to an exemplary embodiment, inputs are a location (xCb, yCb) of a current block and a size (nCbS) of the current block, and outputs are a flag (dvAvailFlag) which indicates whether a disparity vector is predictable, a disparity vector mvDisp, and a reference view order index (refViewIdx). Detailed processes of determining whether a disparity vector is predictable by using temporal neighboring block candidates will be described later.

Then, when dvAvailFlag is 0, locations (xN, yN) of A1 and B1 that are neighboring block candidates N are respectively (xCb−1, yCb+nCbS−1) and (xCb+nCbS−1, yCb−1), and following operations are applied by stages.

1. When yCb−1 is smaller than ((yCb>>Log2CtbSizeY)<<Log2CtbSizeY), an algorithm shown in Table 2 below may be applied.

TABLE 2 xB1 = ( ( xB1 >> 3 ) << 3 ) + ( ( xB1 >> 3) & 1 ) * 7

2. A process of determining whether the neighboring block candidates N are available (available) according to a z-scan order is performed. For example, when the neighboring block candidate N is outside a border of a current picture, available may be 0.

3. When available is 1 and a prediction mode (CuPredMode[xN][yN]) of a current block is an intra-mode (MODE_INTRA), available is set to 0.

4. When the following conditions shown in Table 3 below are all satisfied (true), available is set to 0.

TABLE 3 checkParallelMergeFlag == 1
( xCb >> ( log2_parallel_merge_level_minus2 + 2) ) is equal to ( xN >> ( log2_parallel_merge_level_minus2 + 2) )
( yCb >> ( log2_parallel_merge_level_minus2 + 2) ) is equal to ( yN >> ( log2_parallel_merge_level_minus2 + 2) ).

5. A flag availableIvpMvSearchFlagN is set to the same value as availableN.

6. When one of the conditions from among when the neighboring block candidate N is B1 and when ((yN>>Log 2CtbSizeY)<<Log 2CtbSizeY) is smaller than ((yCb>>Log 2CtbSizeY)<<Log 2CtbSizeY) is satisfied, availableIvpMvSearchFlagN is set to 0.

7. A flag availableFlagIvpMvN is set to 0.

8. When X is 0 or 1, a flag dvAvailFlag is 0, availableN is 1, RefIdxLX[xN][yN] is equal to or higher than 0, and PredFlagLX[xN][yN] is 1, the following processes are applied.

(1) If RefPicListX[RefIdxLX[xN][yN]] is an inter-view reference picture of a current picture, variables are set as shown in Table 4 below.

TABLE 4 refViewIdx = ViewIdx( RefPicListX[ RefIdxLX[ xN ][ yN ] ] )
mvDisp = MvLXN[ xN ][ yN ]
dvAvailFlag = 1

In other words, a reference view index (refViewIdx) is set to a view index (ViewIdx(RefPicListX[RefIdxLX[xN][yN]])) of a neighboring block N, and a disparity vector (mvDisp) is set to a motion vector MvLXN[xN][yN] of a neighboring block candidate, and a disparity vector is set to be usable.

(2) In another case, when a reference picture (RefPicListX [RefIdxLX[xN][yN]]) of a neighboring block N is not an inter-view reference picture, the following processes are applied. When availableIvpMvSearchFlagN is 1, availableFlagIvpMvN is 0, CuPredMode[xN][yN] is a skip mode (MODE_SKIP), and a flag IvpMvFlag[xN][yN] indicating whether a disparity is usable is 1, variables are set as shown in Table 5 below.

TABLE 5 ivpMvDispN = MvRefinedDisp[ xN ][ yN ]
refViewIdxN = RefViewIdx[ xN ][ yN ]
availableFlagIvpMvN = 1

In other words, ivpMvDispN is set to a disparity vector (MvRefinedDisp[xN][yN]) of a neighboring block candidate N, refViewIdxN is set to a reference view index of the neighboring block candidate N, and a motion vector in an inter-layer direction of the neighboring block candidate N is set to be usable.

Then, when dvAvailFlag is 0 and a flag availableFlagIvpMvN is 1 when the neighboring block candidate N is A1 or B1, variables are set as shown in Table 6 below.

TABLE 6 mvDisp = ivpMvDispN
refViewIdx = refViewIdxN
dvAvailFlag = 1

Also, when dvAvailFlag is 0, refViewIdx is set to DefaultRefViewIdx and a disparity vector mvDisp is set to (0,0).

A method of predicting a disparity vector by using temporal neighboring block candidates described above may be realized as follows.

First, inputs are a location (xCb, yCb) of a current block and a size (nCbS) of the current block, and outputs are a flag (dvAvailFlag) which indicates whether a disparity vector is predictable, a disparity vector (mvDisp), and a reference view order index (refViewIdx).

A luma location (xCCtr, yCCtr) is specified by a center location of a current block derived according to equations shown in Table 7 below.

TABLE 7 xCCtr = xCb + ( nCbS >> 1 )
yCCtr = yCb + ( nCbS >> 1 )

Then, a flag availableFlag is set to 0 and a disparity vector mvDisp is set to (0,0).

Operations of the following processes are recursively repeated while i increases from 0 to NumDdvCandPics−1, and the following processes are ended when availableFlag is set to 1.

1. It is assumed that a prediction unit colPu of DdvCandPicsList[i] covers a position ((xCCtr>>4)<<4, (yCCtr>>4)<<4).

2. A position (xPCol, yPCol) is set to a location of a left top sample of colPu related to a left top of a luma sample of DdvCandPicsList[i].

3. If a slice type is B, a variable dir is set to the same value as collocated_from_l0_flag, and in other cases, the variable dir is set to the same value as 1−collocated_from_l0_flag.

4. The following processes are recursively performed with respect to an X value from dir to 1−dir.

(3) Variables candPicRefPicList, candPredFlag, candRefIdx, and candMV are set to MvLX of RefPicListX, RefIdxLX, and DdvCandPicsList[i].

(4) When colPu is not encoded in an intra prediction mode and candPredFlag[xPCol][yPCol] is 1, candRefViewIdx is set to ViewIdx(candPicRefPicList[candRefIdx[xPCol][yPCol]].

Also, when candRefViewIdx and ViewIdx(DdvCandPicsList[i]) are not the same and ViewIdx of an inter-view reference picture is the same as candViewIdx of RefPicList0 or RefPicList1, an operation shown in Table 8 may be performed.

TABLE 8 refViewIdx = candRefViewIdx
refViewIdx = refViewIdxN
mvDisp = candMV[ xPCol ] [ yPCol ]
availableFlag = 1

However, when a disparity vector is unable to be predicted by using neighboring blocks and a default disparity vector is set to (0,0), it is highly likely that a predicted disparity vector is not accurate since a disparity is generated in most multi-view images. Accordingly, the disparity vector determiner 14 may set a default disparity vector to nonzero so as to predict a disparity vector similar to an actual disparity vector.

Figure 7A:
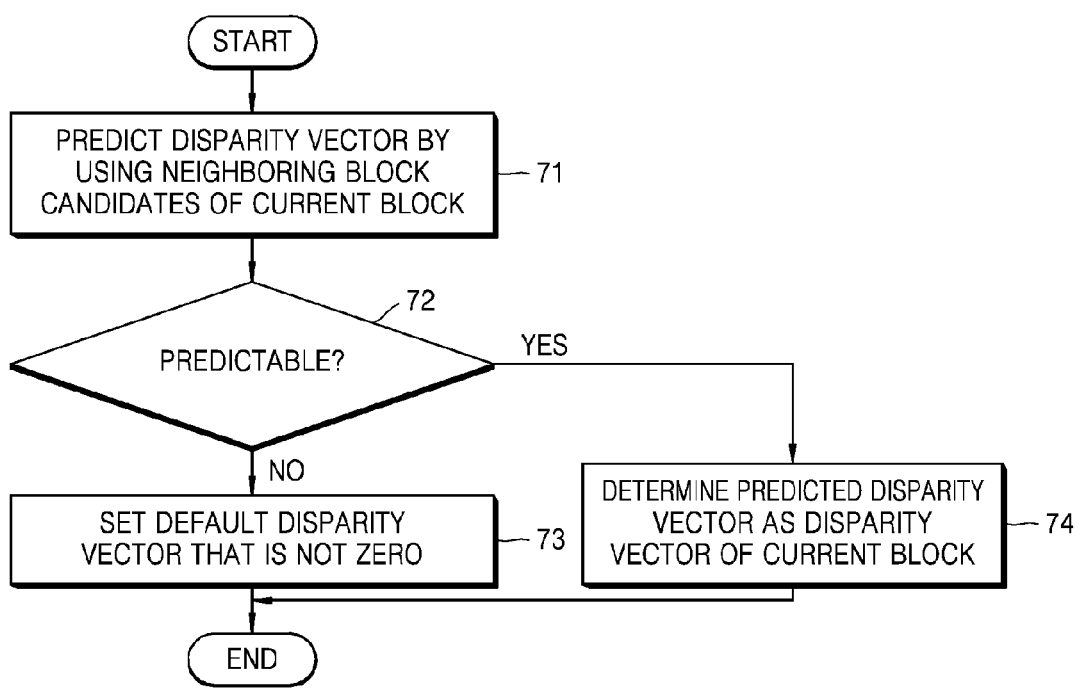
FIG. 7A is a flowchart of a method of determining a disparity vector when the disparity vector is not predictable, according to an exemplary embodiment.

For example, FIG. 7A is a flowchart of a method of determining a disparity vector when the disparity vector is not predictable, according to an exemplary embodiment.

In operation 71, the inter-layer video decoding apparatus 20 may predict a disparity vector by using a neighboring block candidate of a current block. Since a method of predicting a disparity vector based on neighboring blocks of a current block has been described above with reference to FIGS. 5 through 6B, details thereof are not repeated.

In operation 72, the inter-layer video decoding apparatus 20 determines whether the disparity vector of the current block is predictable. For example, it is determined whether there is a neighboring block candidate having a motion vector in an inter-layer direction or a neighboring block candidate having disparity vector information is found from among neighboring block candidates.

When the disparity vector is predictable, the inter-layer video decoding apparatus 20 may determine the predicted disparity vector as the disparity vector of the current block in operation 74.

On the other hand, when the disparity vector is not predictable, the video decoding apparatus 20 may set a default disparity vector that is not zero to the current block.

In detail, the video decoding apparatus 20 may determine a disparity value of the current block by using a pre-set default disparity vector (0,0), a camera parameter, and a depth value of an inter-layer depth image.

For example, an intermediate value of a range of a depth value of a depth image (for example, when a depth value has a range of 8 bit, 128 may be an intermediate value) may be converted to a disparity, and a value of the disparity may be determined to be a default disparity vector.

Figure 7B:
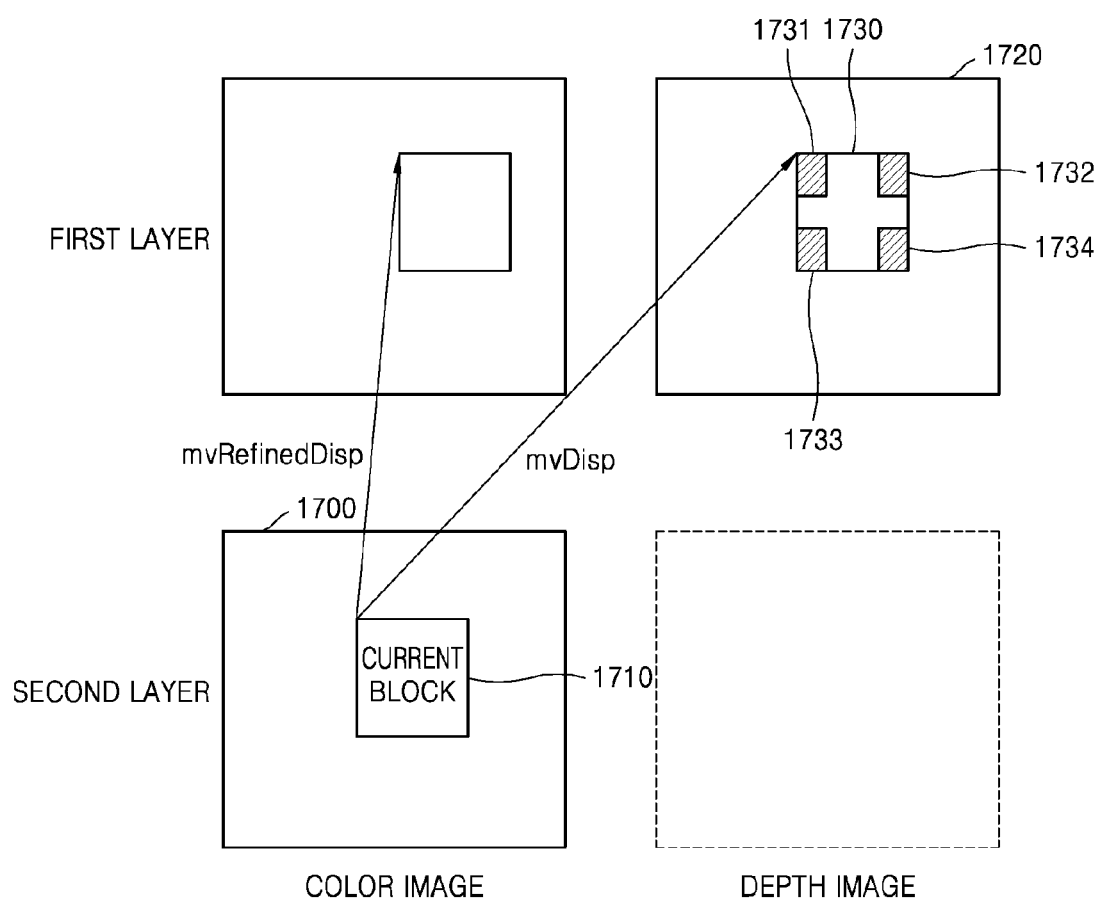
FIG. 7B is a diagram for describing a method of determining a disparity vector when the disparity vector is not predictable, according to an exemplary embodiment.

As another example, FIG. 7B is a diagram for describing a method of determining a disparity vector when the disparity vector is not predictable, according to an exemplary embodiment.

When a disparity vector is not predicted by using neighboring block candidates (dvAvailFlag=0), the inter-layer video decoding apparatus 20 according to an exemplary embodiment may determine a disparity vector mvRefinedDisp of a current block 1710 decoded from a second layer color image 1700 by using a default disparity vector mvDisp and a first layer depth image 1720. According to an exemplary embodiment, the default disparity vector mvDisp has a (0,0) value.

In detail, the inter-layer video decoding apparatus 20 may determine a co-located reference block 1730 of the first layer depth image 1720 indicated by the default disparity vector mvDisp based on a location of the second layer current block 1710.

Then, the inter-layer video decoding apparatus 20 may obtain a highest depth value from among corner depth values 1731 through 1374 of the determined reference block 1730 of the first layer depth map, and converts the highest depth value to a disparity vector.

For example, as a syntax element, a disparity vector value 'disparitySamples[ ][ ]' converted to a size (nCbS)×(nCbS) may be determined by using a location (xCb,yCb) of the current block 1710, the default disparity vector mvDisp, and a reference view index refviewiewIdx. According to an exemplary embodiment, nCbS may denote a size of a coding unit of the current block 1710 in a horizontal direction or a vertical direction.

Lastly, the inter-layer video decoding apparatus 20 determines a disparity vector mvRefinedDisp of the current block 1710 by using a horizontal component value of the converted disparity vector and a vertical component value of the default disparity vector mvDisp.

For example, the disparity vector mvRefinedDisp may be indicated by (disparitySamples[0][0], mvDisp[1]). According to an exemplary embodiment, a vertical component value 'mvDisp[1]' of the disparity vector may be 0.

A certain mode (for example, a residual prediction mode) is not executed when a disparity vector is not predictable from a neighboring block in an inter-layer encoding method, but a mode of using a disparity vector may be used by setting the disparity vector to a nonzero value.

In detail, a residual prediction mode denotes a mode of signaling a difference value between a motion vector value of a second layer current block and a motion vector value of a corresponding first layer reference block. However, when a disparity vector is not predicted from a neighboring block, the residual prediction mode is not used since prediction accuracy is low. However, the inter-layer video decoding apparatus 20 according to an exemplary embodiment may use a mode of using a disparity vector by setting the disparity vector to a nonzero value.

The inter-layer video decoding apparatus 20 may perform a similar operation when a disparity vector predicted from a neighboring block is (0,0).

Figure 7C:
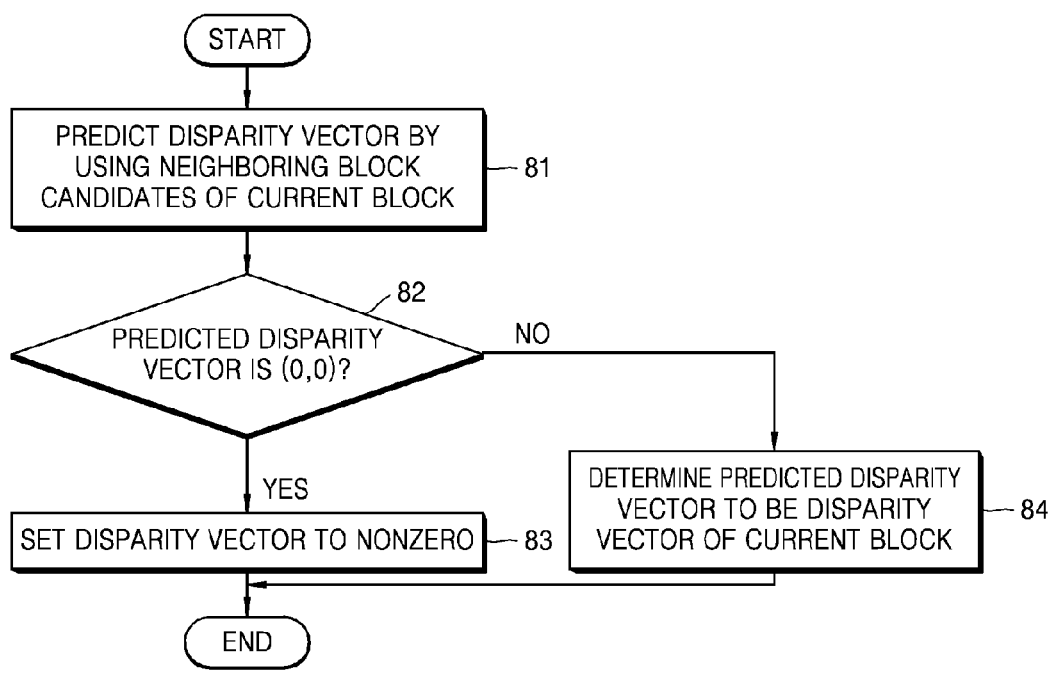
FIG. 7C is a flowchart of a method of determining a disparity vector when the disparity vector is predicted to be (0,0), according to an exemplary embodiment.

FIG. 7C is a flowchart of a method of determining a disparity vector when the disparity vector is predicted to be (0,0), according to an exemplary embodiment.

The inter-layer video decoding apparatus 20 predicts a disparity vector by using neighboring block candidates of a current block in operation 81, and determines whether the predicted disparity vector is (0,0) in operation 82.

If the predicted disparity vector is not (0,0), the inter-layer video decoding apparatus 20 determines the predicted disparity vector to be a disparity vector of a current block in operation 84.

On the other hand, if the predicted disparity vector is (0,0), it is determined that accuracy of the disparity vector prediction is low, and the inter-layer video decoding apparatus 20 may perform operation 85. In this case, similar to when a disparity vector is not predicted, the inter-layer video decoding apparatus 20 may set a disparity vector of a current block to a nonzero disparity vector.

When the disparity vector predicted from neighboring blocks is (0,0), it is determined that accuracy of the disparity vector is low, and thus the inter-layer video decoding apparatus 20 may be set so as not to use a mode of using a disparity vector.

Figure 7D:
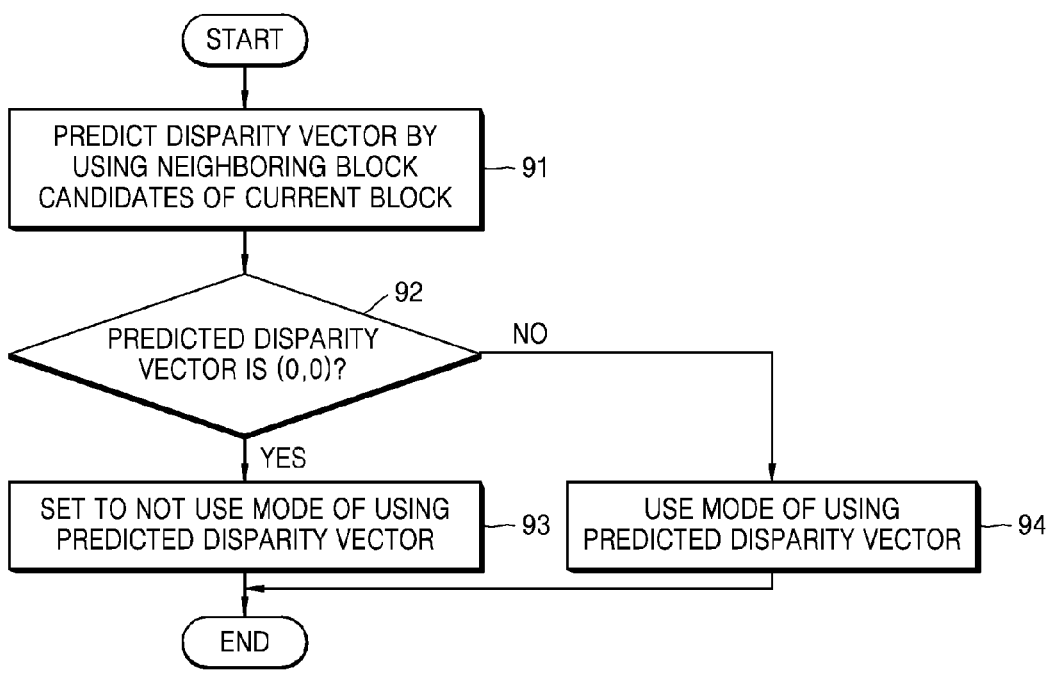
FIG. 7D is a flowchart of a method of setting a mode using a disparity vector when the disparity vector is predicted to be (0,0), according to an exemplary embodiment.

For example, FIG. 7D is a flowchart of a method of setting a mode using a disparity vector when the disparity vector is predicted to be (0,0), according to an exemplary embodiment.

The inter-layer video decoding apparatus 20 predicts a disparity vector by using neighboring block candidates of a current block in operation 91, and determines whether the predicted disparity vector is (0,0) in operation 92.

When the predicted disparity vector is not (0,0), the inter-layer video decoding apparatus 20 uses a mode of using the predicted disparity vector in operation 94.

On the other hand, when the predicted disparity vector is (0,0), the inter-layer video decoding apparatus 20 determines that the accuracy of disparity vector prediction is low, and may be set to not use a mode of using the predicted disparity vector in operation 93. Accordingly, the inter-layer video decoding apparatus 20 may increase encoding efficiency by not using a mode of using a disparity vector when accuracy of a disparity vector is low.

The operations described above with reference to FIGS. 5 through 7D are performed by the inter-layer video decoding apparatus 20, but it would be clear to one of ordinary skill in the art that the operations may also be performed by the inter-layer video encoding apparatus 10.

As described above, the inter-layer video encoding apparatus 10 according to some exemplary embodiments and the inter-layer video decoding apparatus 20 according to some exemplary embodiments may split blocks of video data into coding units having a tree structure, and coding units, prediction units, and transformation units may be used for inter-layer prediction or inter prediction of coding units. Hereinafter, a video encoding method, a video encoding apparatus, a video decoding method, and a video decoding apparatus based on coding units having a tree structure and transformation units, according to some exemplary embodiments, will be described with reference to FIGS. 8 through 20.

In principle, during encoding and decoding processes for a multi-layer video, encoding and decoding processes for first layer images and encoding and decoding processes for second layer images are separately performed. In other words, when inter-layer prediction is performed on a multi-layer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7, in order to encode and decode a video stream, inter-layer prediction and compensation are performed on base layer images and second layer images.

Figure 8:
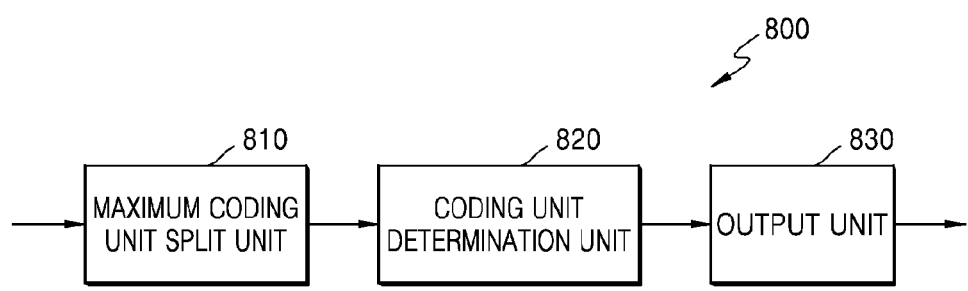
FIG. 8 is a block diagram of a video encoding apparatus configured to perform an encoding operation based on coding units according to a tree structure, according to an exemplary embodiment.

Accordingly, in order for the encoder 12 of the inter-layer video encoding apparatus 10 according to an exemplary embodiment to encode a multi-layer video based on coding units having a tree structure, the inter-layer video encoding apparatus 10 may include as many video encoding apparatuses 800 of FIG. 8 as the number of layers of the multi-layer video so as to perform video encoding according to each single-layer video, thereby controlling each video encoding apparatus 800 to encode an assigned single-layer video. Also, the inter-layer video encoding apparatus 10 may perform inter-view prediction by using encoding results of individual single viewpoints of each video encoding apparatus 800. Accordingly, the encoder 12 of the inter-layer video encoding apparatus 10 may generate a base view video stream and a second layer video stream, which include encoding results according to layers.

Figure 9:
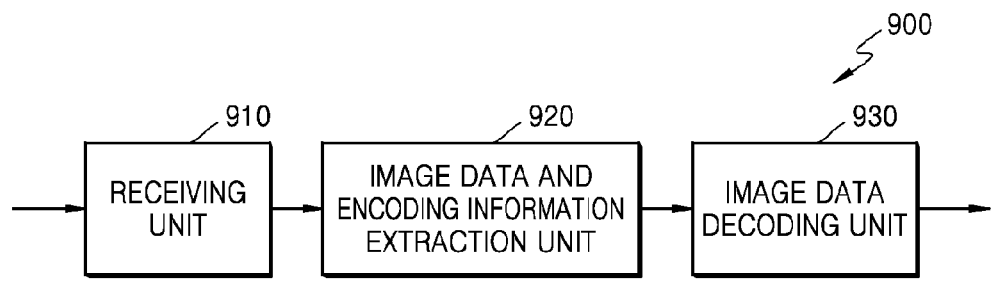
FIG. 9 is a block diagram of a video decoding apparatus configured to perform a decoding operation based on coding units according to a tree structure, according to an exemplary embodiment.

Similarly, in order for the decoder 26 of the inter-layer video decoding apparatus 20 according to an exemplary embodiment to decode a multi-layer video based on coding units having a tree structure, the inter-layer video decoding apparatus 20 may include as many video decoding apparatuses 900 of FIG. 9 as the number of layers of the multi-layer video so as to perform video decoding according to layers with respect to a received first layer video stream and a received second layer video stream, thereby controlling each video decoding apparatus 900 to decode an assigned single-layer video. Also, the inter-layer video decoding apparatus 900 may perform inter-layer compensation by using a decoding result of an individual single layer of each video decoding apparatus 900. Accordingly, the decoder 26 of the inter-layer video decoding apparatus 20 may generate first layer images and second layer images, which are reconstructed according to layers.

FIG. 8 is a block diagram of the video encoding apparatus 800 configured to perform an encoding operation based on coding units according to a tree structure, according to an exemplary embodiment.

The video encoding apparatus 800 according to an exemplary embodiment is configured to perform video prediction based on coding units according to a tree structure and includes a maximum coding unit split unit 810 (e.g., maximum coding unit splitter), a coding unit determination unit 820 (e.g., coding unit determiner) and an output unit 830 (e.g., outputter). Hereinafter, for convenience of description, the video encoding apparatus 10 according to an exemplary embodiment may also be referred to as the 'video encoding apparatus 800.'

The coding unit determiner 820 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to some exemplary embodiments is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 820 encodes at least one split region obtained by splitting a region of the maximum coding unit according to depths, and determines a depth to output a finally encoded image data according to the at least one split region. In other words, the coding unit determiner 820 determines a final depth by encoding the image data in the deeper coding units according to depths, according to the maximum coding unit of the current picture, and selects a depth having the least encoding error. The determined final depth and the encoded image data according to the determined coded depth are output to the output unit 830.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each of the coding units, separately. Accordingly, even when image data is included in one maximum coding unit, the encoding errors may differ according to regions in the one maximum coding unit, and thus the final depths may differ according to regions in the image data. Thus, one or more final depths may be determined in one maximum coding unit, and the image data of the maximum coding unit may be divided according to coding units of at least one final depth.

Accordingly, the coding unit determiner 820 according to an exemplary embodiments may determine coding units having a tree structure included in the maximum coding unit. The 'coding units having a tree structure' according to some exemplary embodiments include coding units corresponding to a depth determined to be the final depth, from among all deeper coding units included in the maximum coding unit. A coding unit of a final depth may be hierarchically determined according to depths in the same region of the maximum coding unit, and may be independently determined in different regions. Similarly, a final depth in a current region may be independently determined from a final depth in another region.

A maximum depth according to some exemplary embodiments is an index related to the number of splitting times from a maximum coding unit to a minimum coding unit. A first maximum depth according to some exemplary embodiments may denote the total number of splitting times from the maximum coding unit to the minimum coding unit. A second maximum depth according to some exemplary embodiments may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 800 according to an exemplary embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a final depth according to some exemplary embodiments, e.g., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition mode according to some exemplary embodiments include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 according to an exemplary embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to some exemplary embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to some exemplary embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth, but also about information related to prediction encoding and transformation. Accordingly, the coding unit determiner 820 not only determines a depth having a least encoding error, but also determines a partition mode of splitting a prediction unit into a partition, a prediction mode according to prediction units, and a size of a transformation unit for transformation.

Coding units according to a tree structure in a maximum coding unit and methods of determining a prediction unit/ partition, and a transformation unit, according to some exemplary embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs the image data of the maximum coding unit, which is encoded based on the at least one depth determined by the coding unit determiner 820, and split information according to the depth, in bitstreams.

The encoded image data may be obtained by encoding residual data of an image.

The split information according to depth may include information about the depth, about the partition mode in the prediction unit, about the prediction mode, and about a split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and split information is determined for a coding unit of a depth, at least one piece of split information may be determined for one maximum coding unit. Also, a depth of the image data of the maximum coding unit may be different according to locations since the image data is hierarchically split according to depths, and thus a depth and split information may be set for the image data.

Accordingly, the output unit 830 according to an exemplary embodiment may assign a corresponding depth and encoding information about an encoding mode to at least one of the coding unit, the prediction unit, and a minimum unit included in the maximum coding unit.

The minimum unit according to an exemplary embodiment may be a square data unit obtained by splitting the minimum coding unit constituting the lowermost depth by 4. Alternatively, the minimum unit according to another exemplary embodiment may be a maximum square data unit that may be included in all of the coding units, prediction units, partition units, and transformation units included in the maximum coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information related to prediction, prediction information, and slice type information.

In the video encoding apparatus 800 according to an exemplary embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 800 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 800 according to an exemplary embodiment, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include as many video encoding apparatuses 800 as the number of layers, in order to encode single-layer images according to layers of a multi-layer video. For example, the first layer encoder 12 may include one video encoding apparatus 800 and the second layer encoder 16 may include as many video encoding apparatuses 800 as the number of second layers.

When the video encoding apparatus 800 encodes first layer images, the coding unit determiner 820 may determine, for each maximum coding unit, a prediction unit for inter-prediction according to coding units having a tree structure, and perform inter-prediction according to prediction units.

Even when the video encoding apparatus 800 encodes second layer images, the coding unit determiner 820 may determine, for each maximum coding unit, coding units and prediction units having a tree structure, and perform inter-prediction according to prediction units.

The video encoding apparatus 800 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus 900 configured to perform a decoding operation based on coding units according to a tree structure, according to an exemplary embodiment.

The video decoding apparatus 900 according to an exemplary embodiment that is configured to perform video prediction based on coding units having a tree structure includes a receiver 910, an image data and encoding information extraction unit 920 (e.g., image data and encoding information extractor), and an image data decoding unit 930 (e.g., image data decoder). For convenience of description, the video decoding apparatus 900 according to an exemplary embodiment may also be referred to as the 'video decoding apparatus 900.

Definitions of various terms, such as a coding unit, a depth, a prediction unit, a transformation unit, and various split information, for decoding operations of the video decoding apparatus 900 according to some exemplary embodiments may be identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each maximum coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information for the coding units having a tree structure according to each maximum coding unit, from the parsed bitstream. The extracted final depth and split information are output to the image data decoder 930. In other words, the image data in a bit stream is split into the maximum coding unit so that the image data decoder 930 decodes the image data for each maximum coding unit.

A depth and split information according to the maximum coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each maximum coding unit extracted by the image data and encoding information extractor 920 is depth and split information determined to generate a minimum encoding error when an encoder, such as the video encoding apparatus 800 according to an exemplary embodiment, repeatedly performs encoding for each deeper coding unit according to depths according to each maximum coding unit. Accordingly, the video decoding apparatus 900 may reconstruct an image by decoding the image data according to a coded depth and an encoding mode that generates the minimum encoding error.

Since encoding information according to some exemplary embodiments, which is information about a depth and an encoding mode, may be assigned to a predetermined data unit from among a corresponding coding unit, a prediction unit, and a minimum unit, the image data and encoding information extractor 920 may extract the depth and the split information according to the predetermined data units. If the depth and the split information of a corresponding maximum coding unit is recorded according to predetermined data units, the predetermined data units to which the same depth and the same split information is assigned may be inferred to be the data units included in the same maximum coding unit.

The image data decoder 930 may reconstruct the current picture by decoding the image data in each maximum coding unit based on the depth and the split information according to the maximum coding units. In other words, the image data decoder 930 may decode the encoded image data based on the extracted information about the partition mode, the prediction mode, and the transformation unit for each coding unit from among the coding units having the tree structure included in each maximum coding unit. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be reconstructed.

The image data decoder 930 may determine a depth of a current maximum coding unit by using split information according to depths. If the split information indicates that image data is no longer split in the current depth, the current depth is the depth. Accordingly, the image data decoder 930 may decode encoded data in the current maximum coding unit by using the information about the partition mode of the prediction unit, the prediction mode, and the size of the transformation unit.

In other words, data units containing the encoding information including the same split information may be gathered by observing the encoding information assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus 20 described above with reference to FIG. 2A may include a number of video decoding apparatuses 900 which are the same in number as the number of viewpoints, so as to reconstruct first layer images and second layer images by decoding a received first layer image stream and a received second layer image stream.

When the first layer image stream is received, the image data decoder 930 of the video decoding apparatus 900 may split samples of first layer images extracted from the first layer image stream by the image data and encoding information extractor 920 into coding units having a tree structure. The image data decoder 930 may reconstruct the first layer images by performing motion compensation according to prediction units for inter prediction, on the coding units having the tree structure obtained by splitting the samples of the first layer images.

When the second layer image stream is received, the image data decoder 930 of the video decoding apparatus 900 may split samples of second layer images extracted from the second layer image stream by the image data and encoding information extractor 920 into coding units having a tree structure. The image data decoder 930 may reconstruct the second layer images by performing motion compensation according to prediction units for inter prediction on the coding units obtained by splitting the samples of the second layer images.

The extractor 920 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 900 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
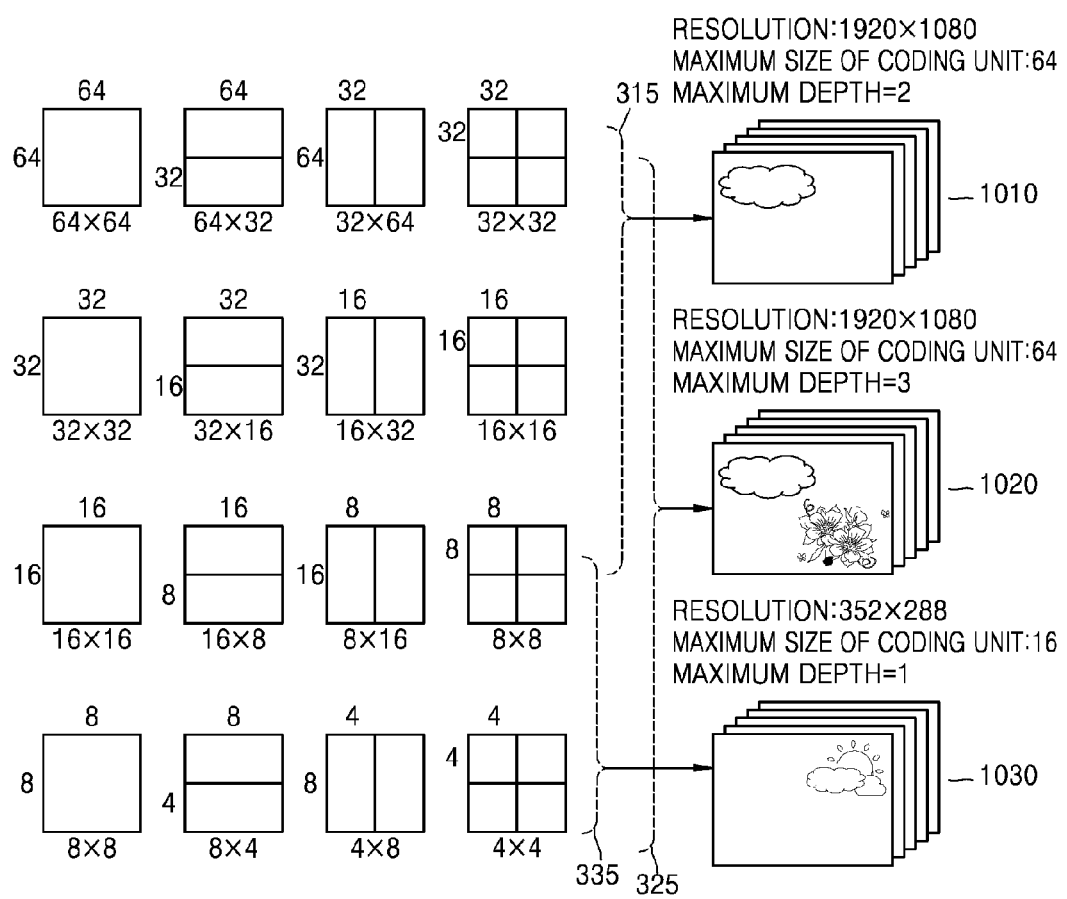
FIG. 10 is a diagram for describing a concept of coding units according to an exemplary embodiment.

FIG. 10 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 330 may be 64.

Since the maximum depth of the video data 1010 is 2, coding units 315 of the vide data 1010 may include a maximum coding unit having a long axis size of 64, and coding units having long axis sizes of 32 and 16 since depths are deepened to two layers by splitting the maximum coding unit twice. Since the maximum depth of the video data 1030 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 1020 is 3, coding units 325 of the video data 1020 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
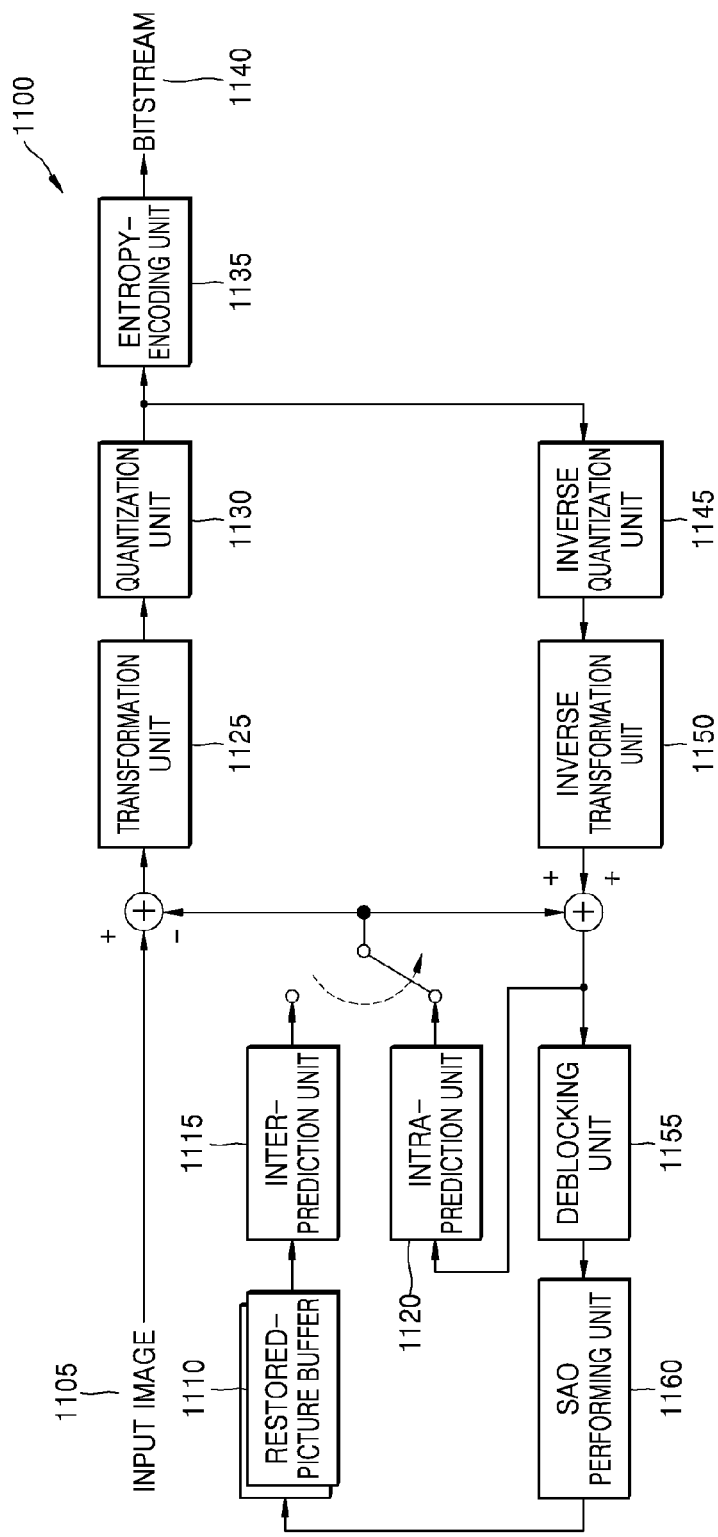
FIG. 11 is a block diagram of an image encoder configured to perform an encoding operation based on coding units, according to an exemplary embodiment.

FIG. 11 is a block diagram of an image encoder 1100 configured to perform video encoding based on coding units, according to an exemplary embodiment.

The image encoder 1100 according to an exemplary embodiment performs operations of the coding unit determiner 820 of the video encoding apparatus 800 to encode image data. In other words, an intra prediction unit 1120 (e.g., intra predictor) performs intra prediction on coding units in an intra mode, from among a current frame 1105 (e.g., input image), per prediction unit, and an inter prediction unit 415 (e.g., inter-predictor) performs inter prediction on coding units in an inter mode by using the current image 1105 and a reference image obtained by a restored picture buffer 1110, per prediction unit. The current picture 1105 may be split into maximum coding units, and then the maximum coding units may be sequentially encoded. According to an exemplary embodiment, the encoding may be performed on coding units split in a tree structure from the maximum coding unit.

Residual data is generated by subtracting prediction data of a coding unit of each mode output from the intra predictor 1120 or the inter predictor 1115 from data of the input image 1105 to be encoded, and the residual data is output as a quantized transformation coefficient through a transformation unit 1125 (e.g., transformer) and a quantization unit 1130 (e.g., quantizer) per transformation unit. The quantized transformation coefficient is restored to residual data in a spatial domain through an inverse quantization unit 1145 (e.g., inverse quantizer) and an inverse transformation unit 1150 (e.g., inverse transformer). The residual data in the spatial domain is added to the prediction data of the coding unit of each mode output from the intra predictor 1120 or the inter predictor 1115 to be restored as data in a spatial domain of the coding unit of the current image 1105. The data in the spatial domain passes through a deblocking unit 1155 (e.g., deblocker) and a sample adaptive offset (SAO) performing unit 1160 (e.g., SAO performing unit) and thus a restored image is generated. The restored image is stored in the restored picture buffer 1110. Restored images stored in the restored picture buffer 1110 may be used as a reference image for inter prediction of another image. The quantized transformation coefficient obtained through the transformer 1125 and the quantizer 1130 may be output as a bitstream 1140 through an entropy encoding unit 1135 (e.g., entropy encoder).

In order for the image encoder 1100 according to an exemplary embodiment to be applied in the video encoding apparatus 800, components of the image encoder 1100, i.e., the inter predictor 1115, the intra predictor 1120, the transformer 1125, the quantizer 1130, the entropy encoder 1135, the inverse quantizer 1145, the inverse transformer 1150, the deblocking unit 1155, and the SAO performer 1160 perform operations based on each coding unit among coding units having a tree structure per maximum coding unit.

Specifically, the intra predictor 1120 and the inter predictor 1115 determine partitions and a prediction mode of each coding unit from among the coding units having a tree structure while considering the maximum size and the maximum depth of a current maximum coding unit, and the transformer 1125 may determine whether to split a transformation unit according to a quad-tree in each coding unit from among the coding units having the tree structure.

Figure 12:
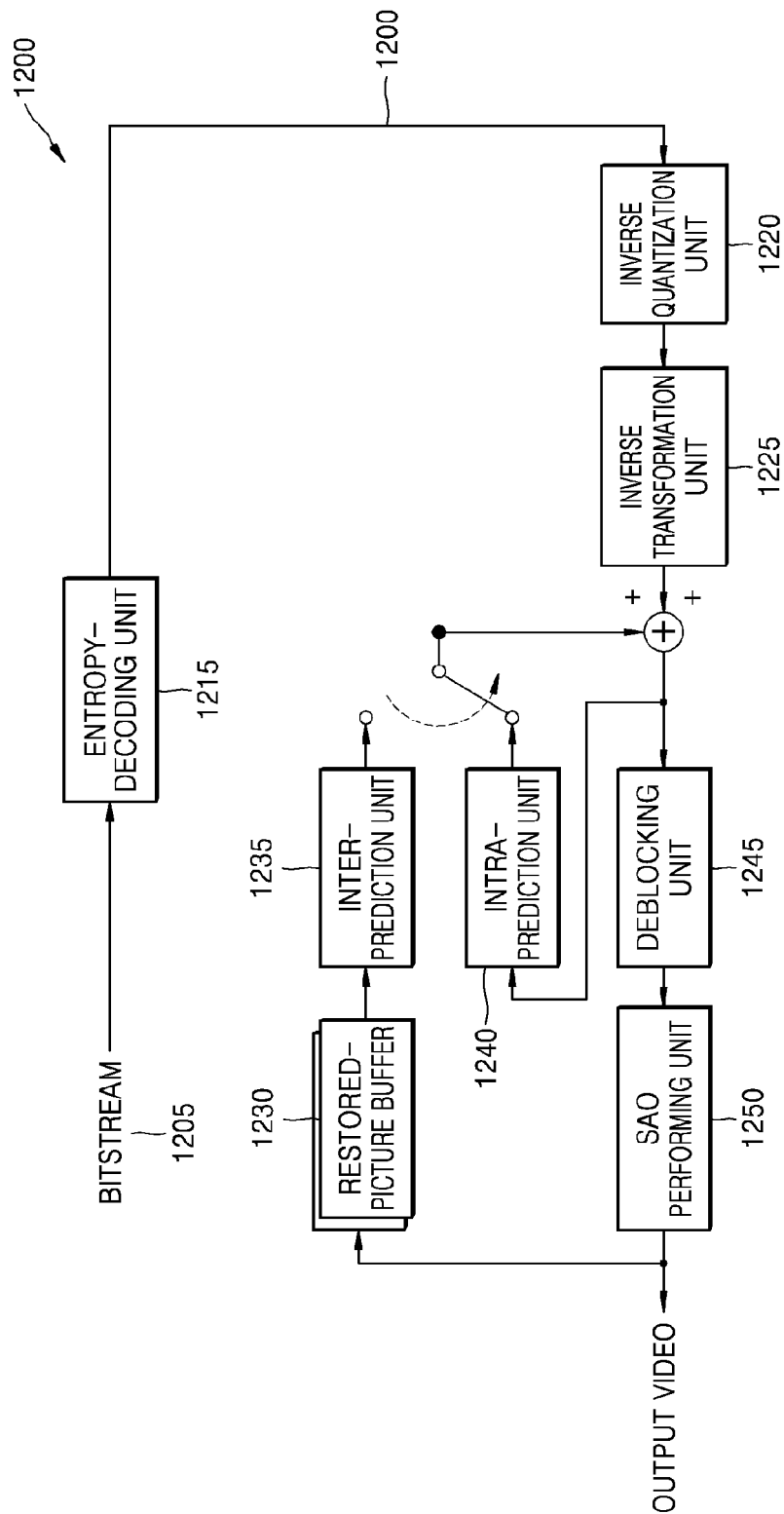
FIG. 12 is a block diagram of an image decoder configured to perform a decoding operation based on coding units, according to an exemplary embodiment.

FIG. 12 is a block diagram of an image decoder 1200 configured to perform image decoding based on coding units according to an exemplary embodiment.

An entropy decoding unit 1215 (e.g., entropy decoder) parses encoded image data that is to be decoded and encoding information required for decoding from a bitstream 1205. The encoded image data is a quantized transformation coefficient, and an inverse quantization unit 1220 (e.g., inverse quantizer) and an inverse transformation unit 1225 (e.g., inverse transformer) restores residual data from the quantized transformation coefficient.

An intra prediction unit 1240 (e.g., intra predictor) performs intra prediction on a coding unit in an intra mode according to prediction units. An inter predictor performs inter prediction on a coding unit in an inter mode from a current image according to prediction units, by using a reference image obtained by a restored picture buffer 1230.

Data in a spatial domain of coding units of the current image is restored by adding the residual data and the prediction data of a coding unit of each mode through the intra predictor 1240 and the inter predictor 1235, and the data in the spatial domain may be output as a restored image through a deblocking unit 1245 (e.g., deblocker) and an SAO performing unit 1250 (e.g., SAO performer). Also, restored images stored in the restored picture buffer 1230 may be output as reference images.

In order to decode the image data in the image data decoder 930 of the video decoding apparatus 900, operations after the entropy decoder 1215 of the image decoder 1200 according to an exemplary embodiment may be performed.

In order for the image decoder 1200 to be applied in the video decoding apparatus 900 according to an exemplary embodiment, components of the image decoder 500, e.g., the entropy decoder 1215, the inverse quantizer 1220, the inverse transformer 1225, the intra predictor 1240, the inter predictor 1235, the deblocking unit 1245, and the SAO performer 1250 may perform operations based on coding units having a tree structure for each maximum coding unit.

Specifically, the intra predictor 1240 and the inter predictor 1235 determine a partition mode and a prediction mode according to each of the coding units having a tree structure, and the inverse transformer 1225 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the second layer encoder 16 of FIG. 1A encodes a video stream of at least two layers, the video encoding apparatus 800 of FIG. 1A may include as many image encoders 400 as the number of layers. Similarly, when the decoder 22 of FIG. 2A decodes a video stream of at least two layers, the video decoding apparatus 900 of FIG. 2A may include as many image decoders 500 as the number of layers.

Figure 13:
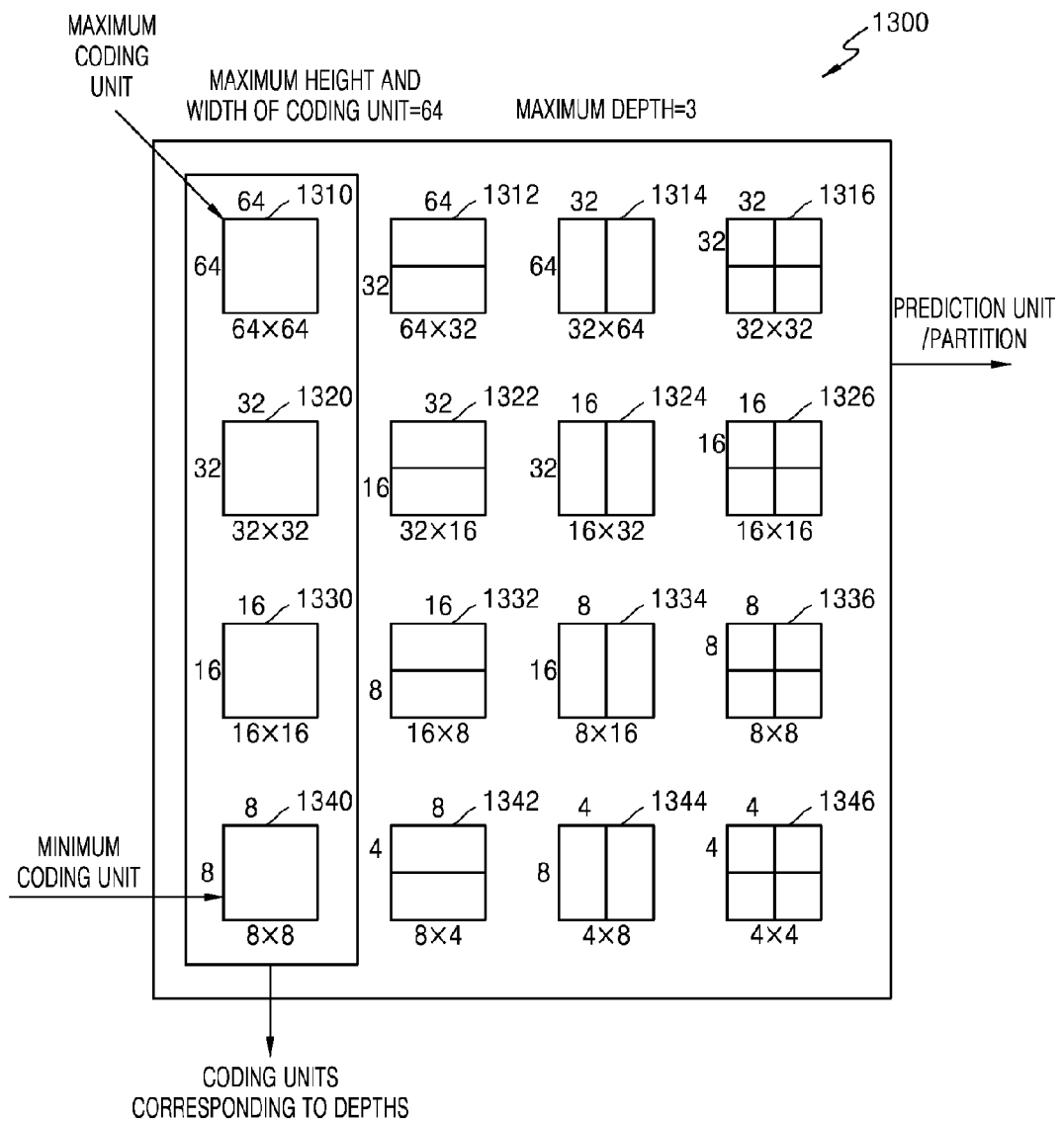
FIG. 13 is a diagram illustrating coding units and partitions, according to an exemplary embodiment.

FIG. 13 is a diagram illustrating coding units and partitions, according to an exemplary embodiment.

The video encoding apparatus 800 according to an exemplary embodiment and the video decoding apparatus 900 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 1300 of coding units according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 1300 of coding units according to some exemplary embodiments, a height and a width of the deeper coding unit are each split. Also, a prediction unit and partitions, which are bases for prediction encoding of each deeper coding unit, are shown along a horizontal axis of the hierarchical structure 1300.

In other words, a coding unit 1310 is a maximum coding unit in the hierarchical structure 1310, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3 exist. The coding unit 1340 having a size of 8×8 and a depth of 3 is a minimum coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions include in the encoding unit 1310, e.g., a partition 1310 having a size of 64×64, partitions 1312 having the size of 64×32, partitions 1314 having the size of 32×64, or partitions 1316 having the size of 32×32.

Similarly, a prediction unit of the coding unit 1320 having the size of 32×32 and the depth of 1 may be split into partitions included in the coding unit 1320, i.e., a partition 1320 having a size of 32×32, partitions 1322 having a size of 32×16, partitions 1324 having a size of 16×32, and partitions 1326 having a size of 16×16.

Similarly, a prediction unit of the coding unit 630 having the size of 16×16 and the depth of 2 may be split into partitions included in the coding unit 1330, i.e. a partition having a size of 16×16 included in the coding unit 1330, partitions 1332 having a size of 16×8, partitions 1334 having a size of 8×16, and partitions 1336 having a size of 8×8.

Similarly, a prediction unit of the coding unit 1340 having the size of 8×8 and the depth of 3 may be split into partitions included in the coding unit 1340, e.g., a partition having a size of 8×8 included in the coding unit 1340, partitions 1342 having a size of 8×4, partitions 1344 having a size of 4×8, and partitions 1346 having a size of 4×4.

In order to determine the depth of the maximum coding unit 1310, the coding unit determiner 820 of the video encoding apparatus 800 according to an exemplary embodiment performs encoding for coding units corresponding to each depth included in the maximum coding unit 1310.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 1300. Alternatively, the minimum encoding error may be searched for by comparing the least encoding errors according to depths, by performing encoding for each depth as the depth deepens along the vertical axis of the hierarchical structure 1300. A depth and a partition having the minimum encoding error in the maximum coding unit 1310 may be selected as the depth and a partition mode of the maximum coding unit 1310.

Figure 14:
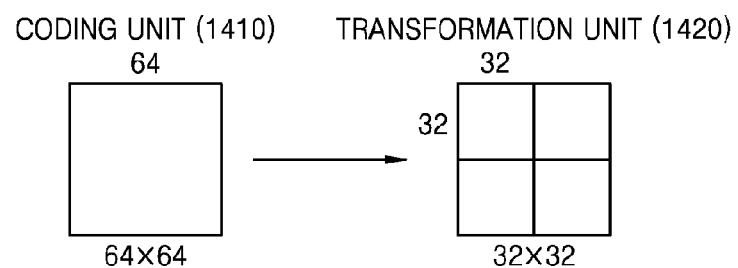
FIG. 14 is a diagram for describing a relationship between a coding unit and transformation units, according to some embodiments of the inventive concept.

FIG. 14 is a diagram for describing a relationship between a coding unit and transformation units, according to an exemplary embodiment.

The video encoding apparatus 800 according to an exemplary embodiment or the video decoding apparatus 900 according to an exemplary embodiment encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 800 according to an exemplary embodiment or the video decoding apparatus 900 according to an exemplary embodiment, if a size of a coding unit 1410 is 64×64, transformation may be performed by using a transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
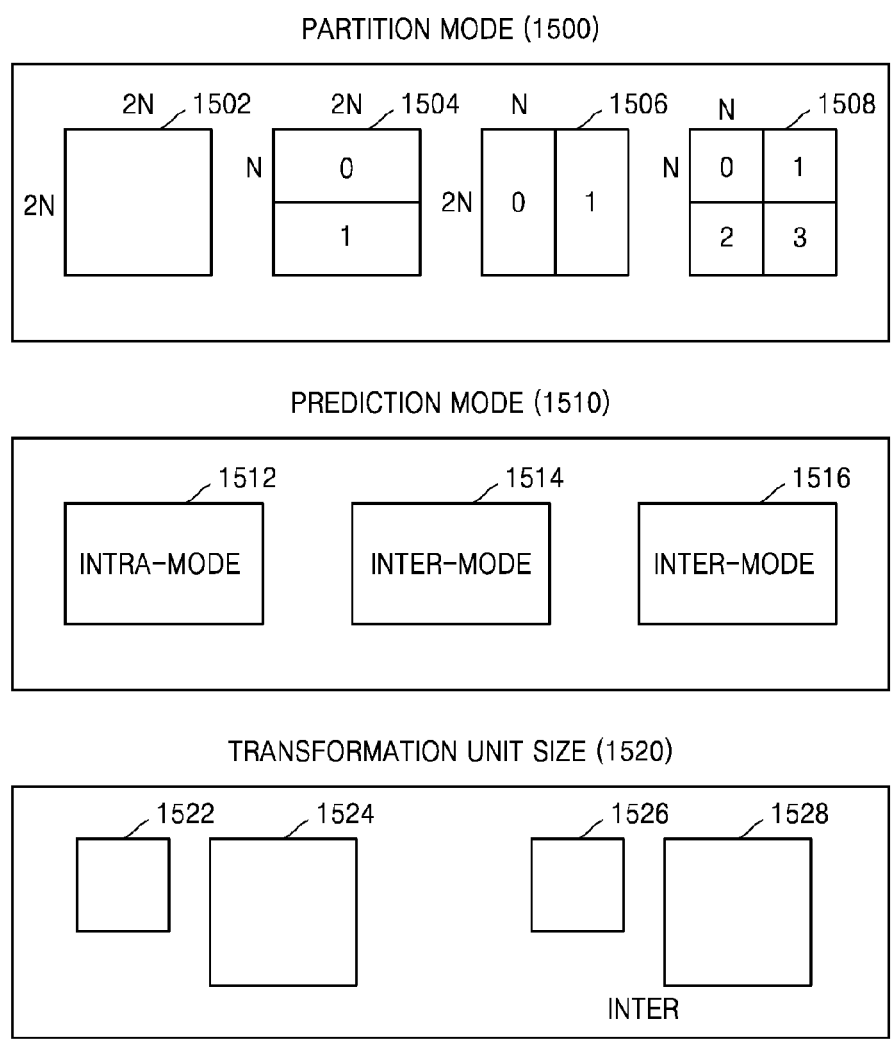
FIG. 15 is a diagram for describing encoding information according to an exemplary embodiment.

FIG. 15 is a diagram for describing encoding information according to an exemplary embodiment.

The output unit 830 of the video encoding apparatus 800 according to an exemplary embodiment may encode and transmit information 1500 about a partition mode, information 1510 about a prediction mode, and information 1520 about a size of a transformation unit for each coding unit corresponding to a depth, as split information.

The information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the information 1500 about a partition type is set to indicate one of the partition 1504 having a size of 2N×N, the partition 1506 having a size of N×2N, and the partition 1508 having a size of N×N.

The information 1510 indicates a prediction mode of each partition. For example, the information 1510 may indicate a mode of prediction encoding performed on a partition indicated by the information 1500, e.g., an intra mode 1512, an inter mode 1514, or a skip mode 1516.

The information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 920 of the video decoding apparatus 900 according to an exemplary embodiment may extract and use the information 1500, 1510, and 1520 for decoding, according to each deeper coding unit.

Figure 16:
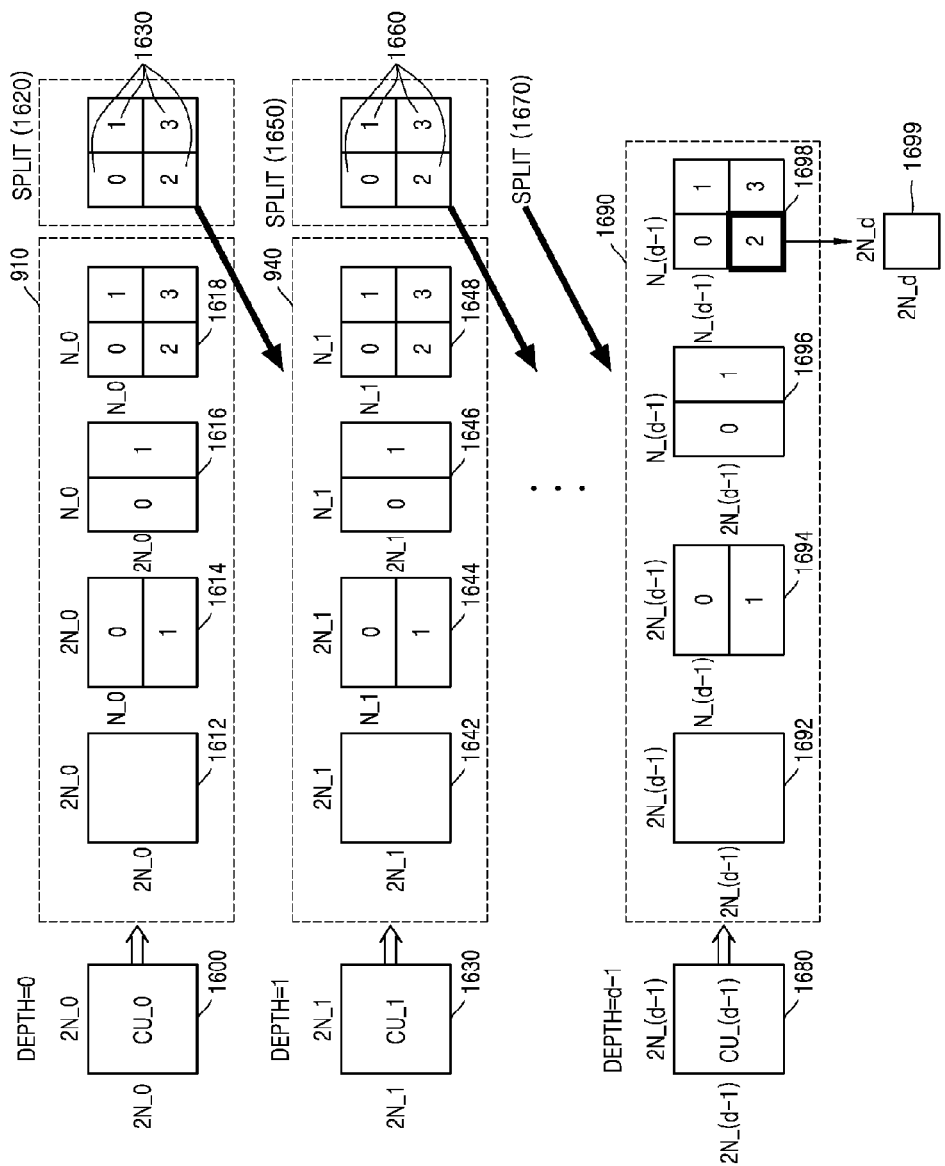
FIG. 16 is a diagram of coding units according to an exemplary embodiment.

FIG. 16 is a diagram of deeper coding units according to depths, according to an exemplary embodiment.

Split information may be used to indicate a change of a depth. The split information indicates whether a coding unit of a current depth is split into coding units of a lower depth.

A prediction unit 910 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partitions 1612 through 1618 which are obtained by symmetrically splitting the prediction unit, but a partition mode is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612 through 1616, the prediction unit 910 may not be split into a lower depth.

If the encoding error is the smallest in the partition mode 1618, a depth is changed from 0 to 1 to split the partition mode 1618 in operation 1620, and encoding is repeatedly performed on coding units 1630 having a depth of 2 and a size of N_0×N_0 to search for a minimum encoding error.

A prediction unit 940 for prediction encoding the coding unit 1630 having a depth of 1 and a size of 2N_1×2N_1 (=N_0×N_0) may include partitions of a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648, a depth is changed from 1 to 2 to split the partition mode 1648 in operation 1650, and encoding is repeatedly performed on coding units 1660, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition modes to search for a partition mode having a minimum encoding error.

Even when the partition mode 1698 has the minimum encoding error, since a maximum depth is d, a coding unit CU_(d−1) having a depth of d−1 is no longer split to a lower depth, and a depth for the coding units constituting a current maximum coding unit 1600 is determined to be d−1 and a partition mode of the current maximum coding unit 1600 may be determined to be N_(d−1)×N_(d−1). Also, since the maximum depth is d, split information for a coding unit 1680 having a depth of d−1 is not set.

A data unit 1699 may be a 'minimum unit' for the current maximum coding unit. A minimum unit according to an exemplary embodiment may be a square data unit obtained by splitting a minimum coding unit having a lowermost depth by 4. By performing the encoding repeatedly, the video encoding apparatus 800 according to an exemplary embodiment may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth d. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 920 of the video decoding apparatus 900 according to an exemplary embodiment may extract and use the information about the depth and the prediction unit of the coding unit 1600 to decode the partition 1612. The video decoding apparatus 900 according to an exemplary embodiment may determine a depth, in which split information is 0, as a depth by using split information according to depths, and use split information of the corresponding depth for decoding.

Figure 17:
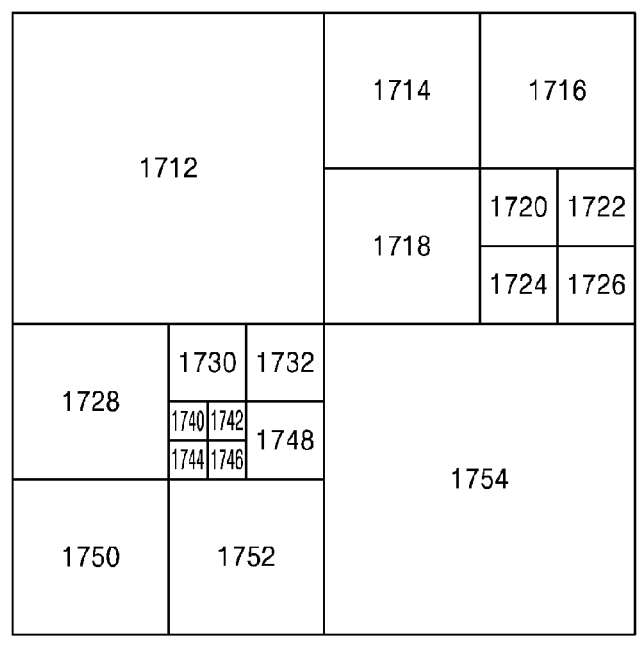
FIGS. 17, 18 and 19 are diagrams for describing a relationship between coding units, prediction units, and transformation units, according to an exemplary embodiment.
Figure 18:
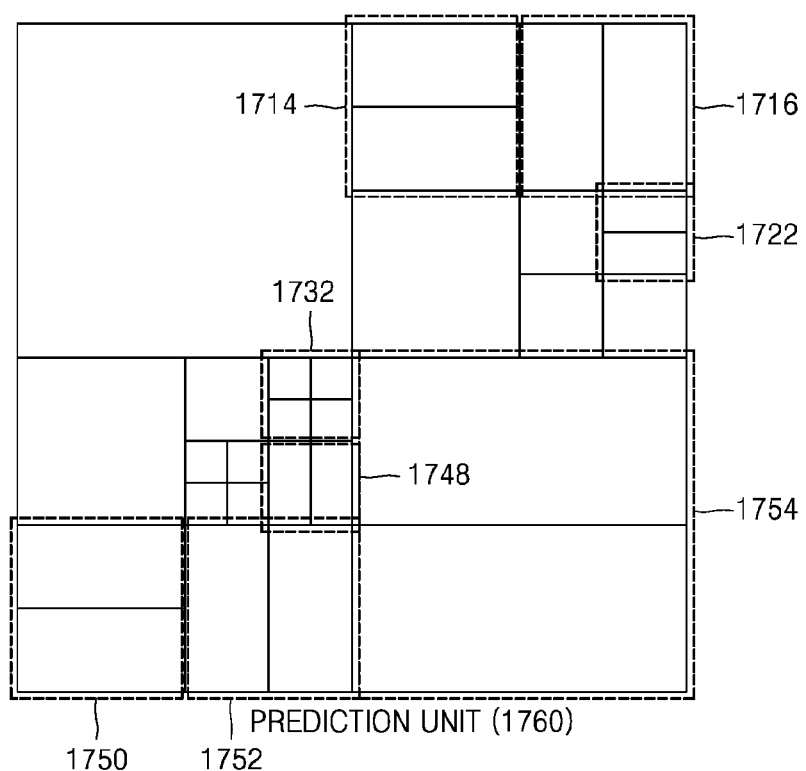
Figure 19:
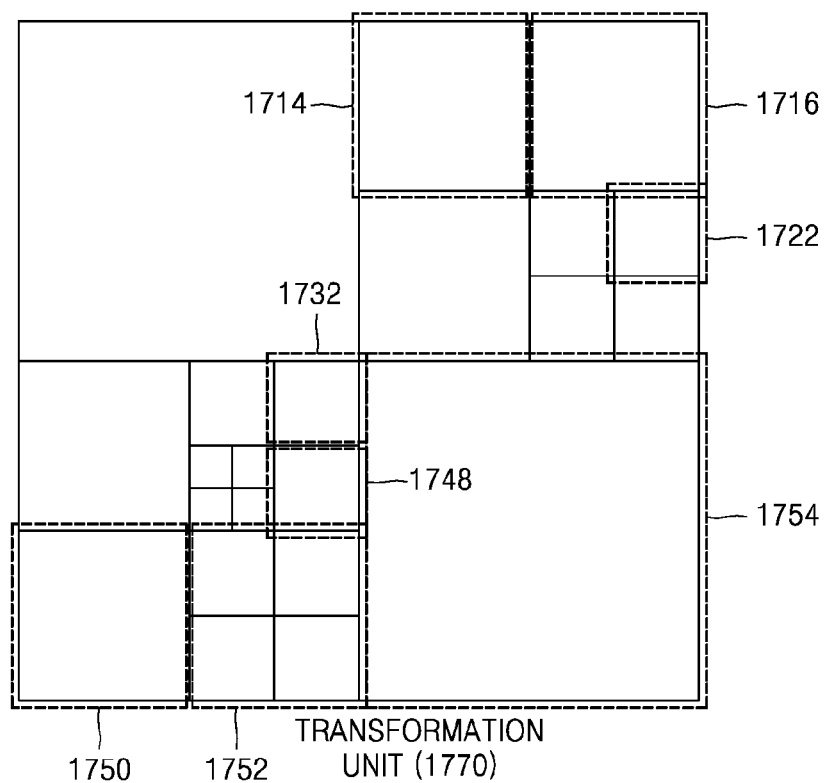

FIGS. 17 through 19 are diagrams for describing a relationship between coding units, prediction units, and transformation units, according to an exemplary embodiment.

Coding units 1710 are coding units having a tree structure, according to depths determined by the video encoding apparatus 800 according to an exemplary embodiment, in a maximum coding unit. Prediction units 1760 are partitions of prediction units of each of coding units according to depths, and transformation units 1770 are transformation units of each of coding units according to depths.

When a depth of a maximum coding unit is 0 in the coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some encoding units 1714, 1716, 1722, 1732, 1748, 1750, 1752, and 1754 are obtained by splitting the coding units in the encoding units 1710. In other words, partition modes in the coding units 1714, 1722, 1750, and 1754 have a size of 2N×N, partition modes in the coding units 1716, 1748, and 1752 have a size of N×2N, and a partition modes of the coding unit 1732 has a size of N×N. Prediction units and partitions of the coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, and 1752 in the transformation units 1770 are different from those in the prediction units 1760 in terms of sizes and shapes. In other words, the video encoding and decoding apparatuses 800 and 900 according to an exemplary embodiment may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition mode, information about a prediction mode, and information about a size of a transformation unit. Table 9 shows the encoding information that may be set by the video encoding and decoding apparatuses 800 and 900 according to various exemplary embodiments.

TABLE 9

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 830 of the video encoding apparatus 800 according to an exemplary embodiment may output the encoding information about the coding units having a tree structure, and the image data and encoding information extractor 920 of the video decoding apparatus 900 according to an exemplary embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

The encoding information about coding units having a tree structure, according to some exemplary embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
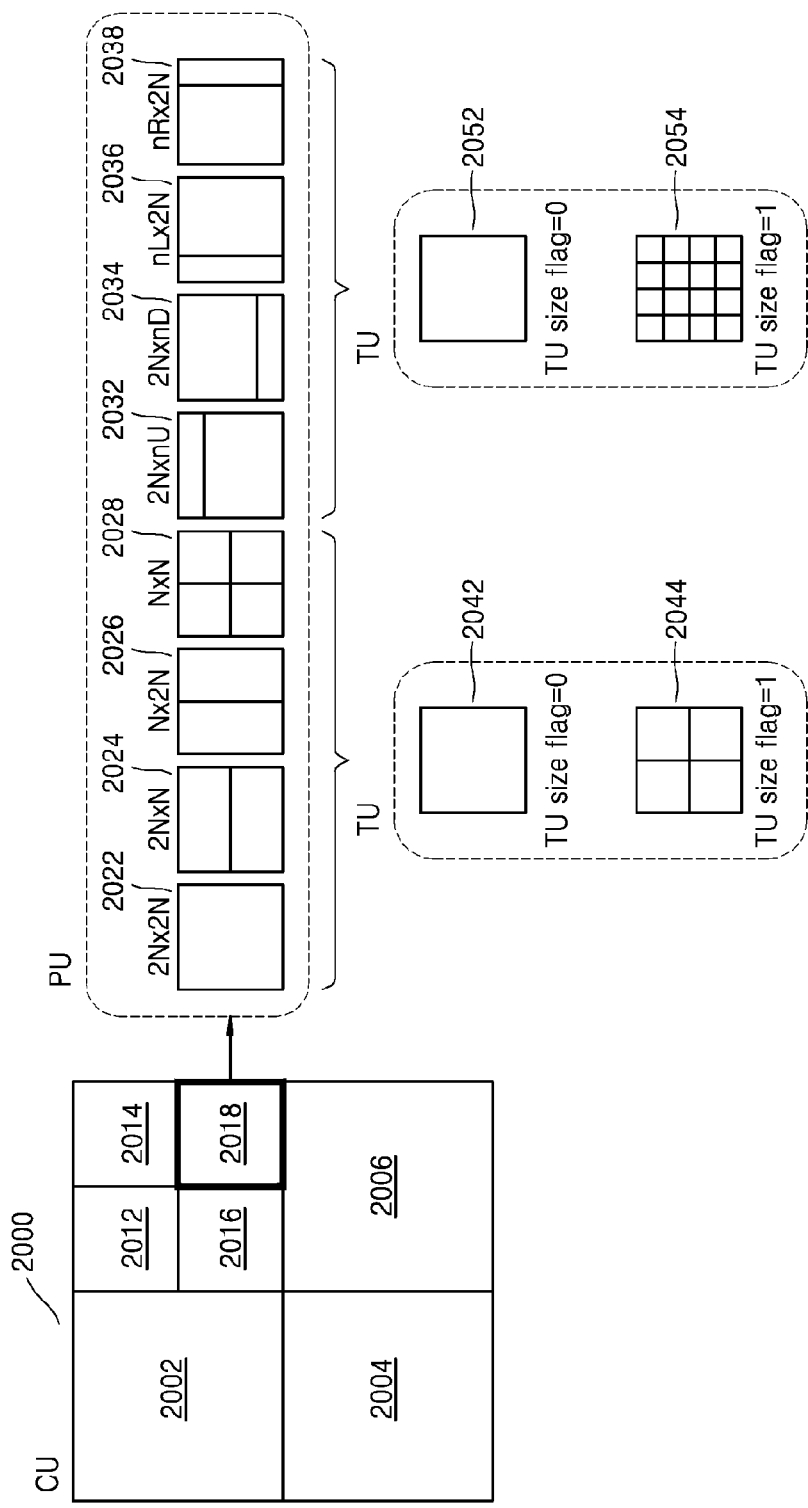
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 9.

A maximum coding unit 2000 includes coding units 2002, 2004, 2006, 2012, 2014, 2016, and 2018 of depths. Here, since the coding unit 2018 is a coding unit of a depth, split information may be set to 0. Information about a partition mode of the coding unit 2018 having a size of 2N×2N may be set to be one of a partition mode 2022 having a size of 2N×2N, a partition mode 2024 having a size of 2N×N, a partition mode 2026 having a size of N×2N, a partition mode 2028 having a size of N×N, a partition mode 2032 having a size of 2N×nU, a partition mode 2034 having a size of 2N×nD, a partition mode 2036 having a size of nL×2N, and a partition mode 2038 having a size of nR×2N.

Split information (TU size flag) of a transformation unit is a type of a transformation index. The size of the transformation unit corresponding to the transformation index may be changed according to a prediction unit type or partition mode of the coding unit.

For example, when the partition mode is set to be symmetrical, e.g., the partition mode 2022, 2024, 2026, or 2028, a transformation unit 2042 having a size of 2N×2N is set if a TU size flag of a transformation unit is 0, and a transformation unit 2044 having a size of N×N is set if a TU size flag is 1.

When the partition mode is set to be asymmetrical, e.g., the partition mode 2032, 2034, 2036, or 2038, a transformation unit 2052 having a size of 2N×2N is set if a TU size flag is 0, and a transformation unit 2054 having a size of N/2×N/2 is set if a TU size flag is 1.

Referring to FIG. 19, the TU size flag is a flag having a value or 0 or 1, but the TU size flag according to some exemplary embodiments is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to some exemplary embodiments, together with a maximum size and minimum size of the transformation unit. The video encoding apparatus 800 according to an exemplary embodiment is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 900 according to an exemplary embodiment may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize,PUSize) \quad \text{Equation (2)}$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize,PartitionSize) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments are not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to reconstruct image data of a spatial region. Thus, a picture and a video that is a picture sequence may be reconstructed. The reconstructed video may be reproduced by a reproducing apparatus, stored in a storage medium, or transmitted through a network.

The exemplary embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter-layer video encoding method and/or the video encoding method described above with reference to FIGS. 1A through 20 may also be collectively referred to as a 'video encoding method according to an exemplary embodiment'. In addition, the inter-layer video decoding method and/or the video decoding method described above with reference to FIGS. 1A through 20 may also be referred to as a 'video decoding method according to an exemplary embodiment'.

Also, a video encoding apparatus including the inter-layer video encoding apparatus 10, the video encoding apparatus 800, or the image encoder 400, which has been described with reference to FIGS. 1A through 20, may also be referred to as a 'video encoding apparatus according to an exemplary embodiment'. In addition, a video decoding apparatus including the inter-layer video decoding apparatus 20, the video decoding apparatus 900, or the image decoder 500, which has been descried with reference to FIGS. 1A through 20, may also be referred to as a 'video decoding apparatus according to an exemplary embodiment'.

A computer-readable recording medium storing a program, e.g., a disc 26000, according to an exemplary embodiment will now be described in detail.

Figure 21:
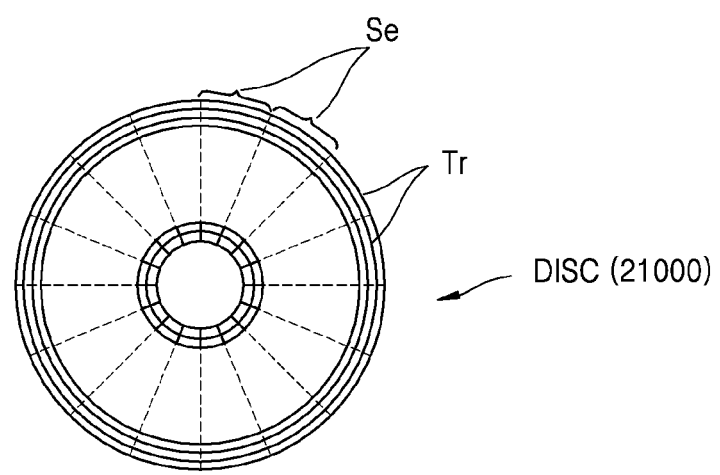
FIG. 21 is a diagram of a physical structure of a disc in which a program is stored, according to an exemplary embodiment.

FIG. 21 is a diagram of a physical structure of the disc 21000 in which a program is stored, according to an exemplary embodiment. The disc 2100, which is a storage medium, may be a hard drive, a compact disc-read only memory (CD-ROM) disc, a Blu-ray disc, or a digital versatile disc (DVD). The disc 21000 includes a plurality of concentric tracks Tr that are each divided into a specific number of sectors Se in a circumferential direction of the disc 21000. In a specific region of the disc 21000 according to an exemplary embodiment, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
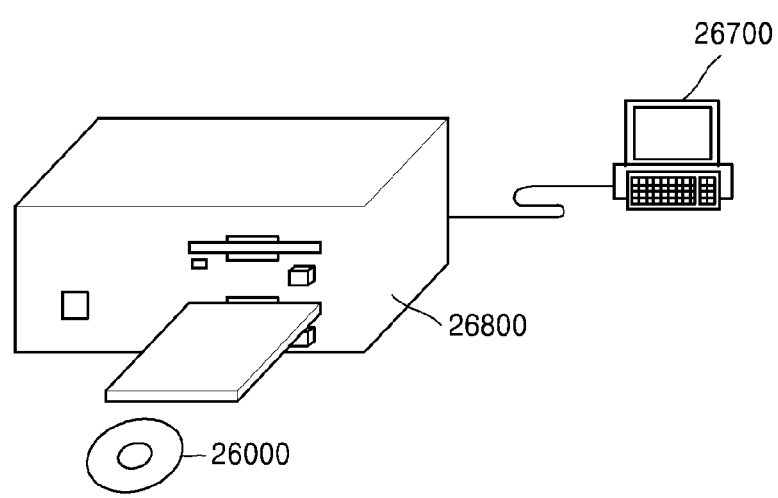
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 27000.

The program that executes at least one of a video encoding method and a video decoding method according to an exemplary embodiment may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
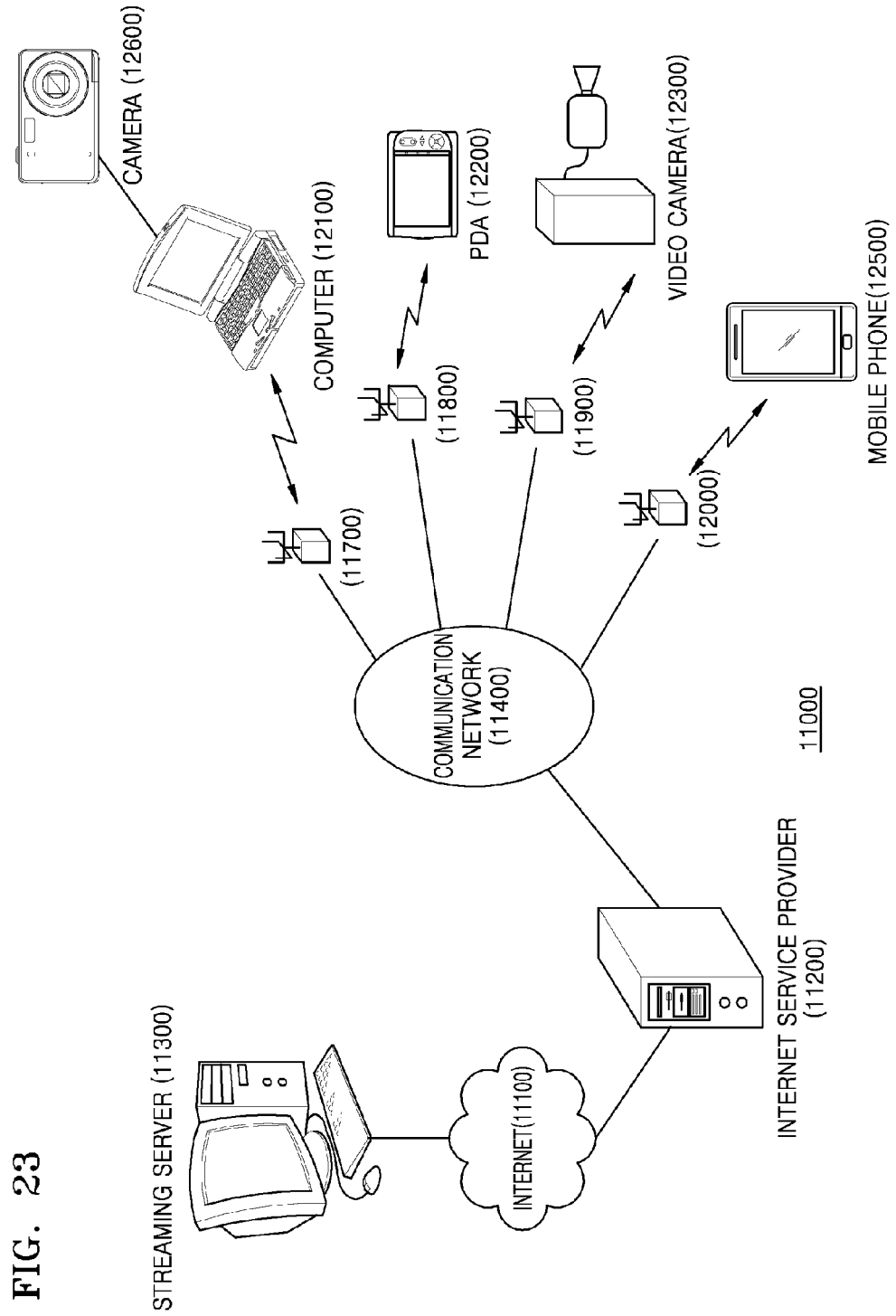
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
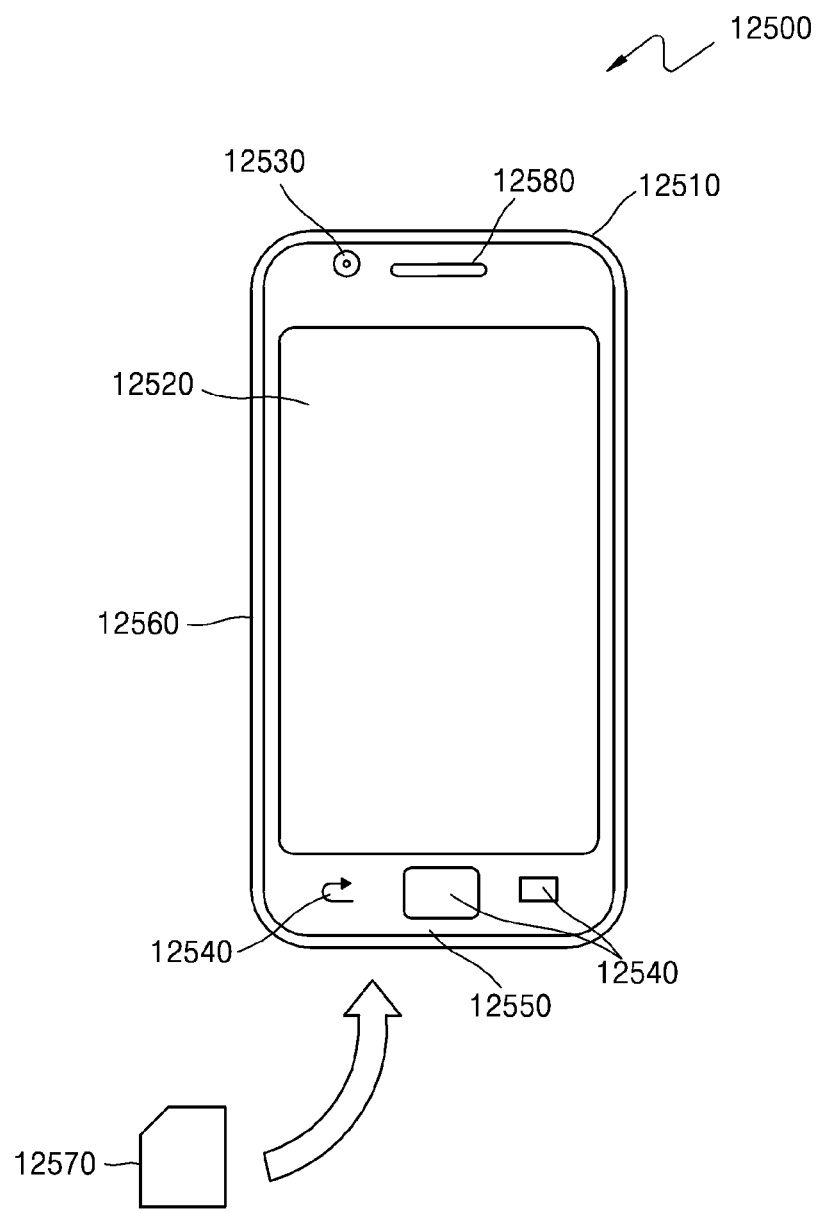
FIGS. 24 and 25 are diagrams respectively of an external structure and an internal structure of a mobile phone to which a video encoding method and a video decoding method are applied, according to an exemplary embodiment.

However, the content supply system 11000 is not limited to the configuration illustrated in FIG. 24, and devices may be selectively connected thereto. The plurality of independent devices may be directly connected to the communication network 11400, and not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding of video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to an exemplary embodiment may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to encoding and decoding operations of a video encoding apparatus and a video decoding apparatus according to exemplary embodiments.

The mobile phone 12500 included in the content supply system 11000 according to an exemplary embodiment will now be described in greater detail with reference to FIGS. 24 and 25.

FIG. 24 illustrates an external structure of the mobile phone 12500 which performs a video encoding method and a video decoding method according to exemplary embodiments, according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded or decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
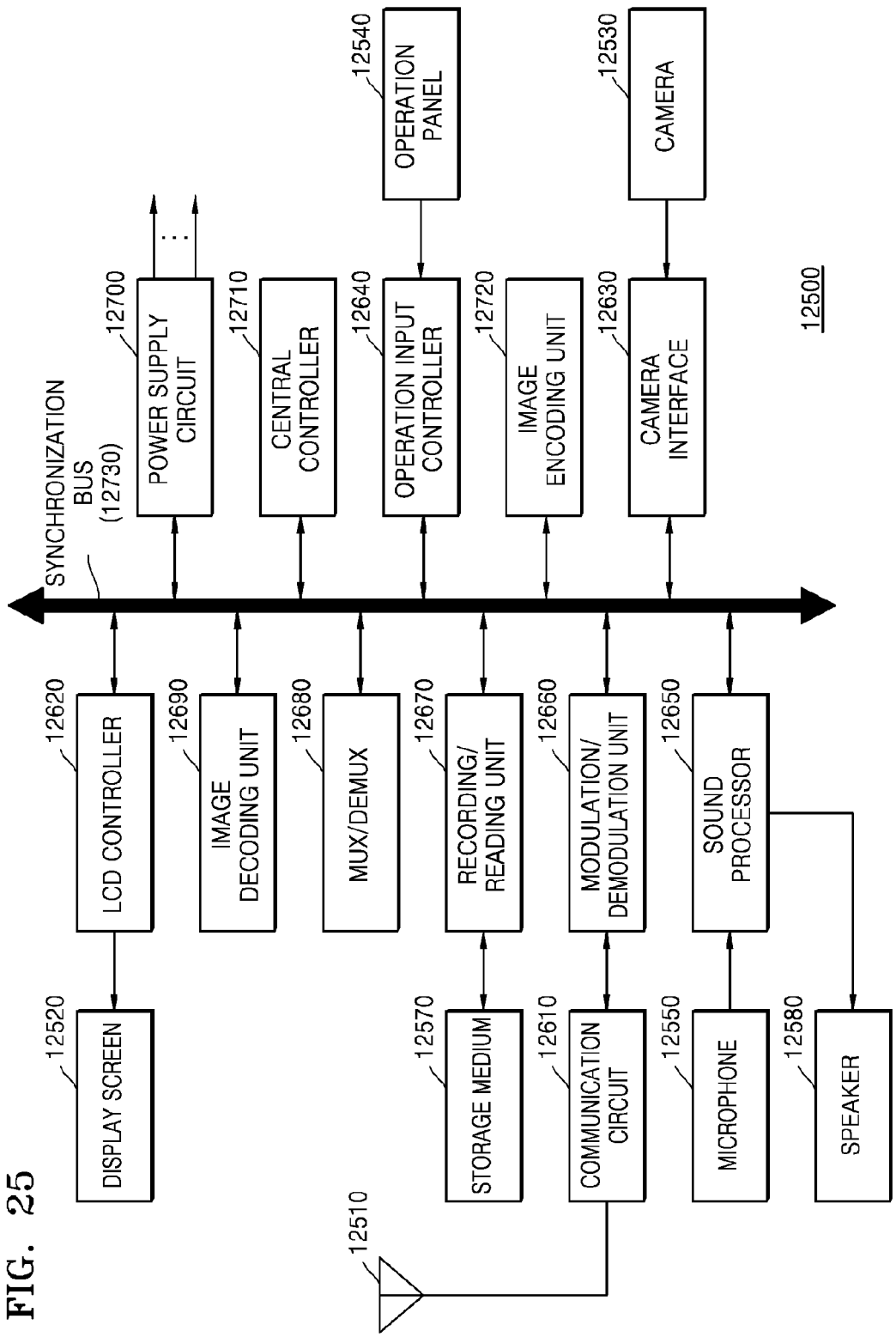

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoding unit 12720 (e.g., image encoder), a camera interface 12630, an LCD controller 12620, an image decoding unit 12690 (e.g., image decoder), a multiplexer/demultiplexer 12680, a recording/reading unit 12670 (e.g., recorder/reader), a modulation/demodulation unit 12660 (e.g., modulator/demodulator), and a sound processor 12650 are connected to a central controller 12710 via a synchronization bus 12730.

If a user operates a power button and sets from a 'power off state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a message, e.g., text message or email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to a structure of the video encoding apparatus 800 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoding unit 12690 and the sound processor 12650, respectively.

A structure of the image decoding unit 12690 may correspond to a structure of the video decoding apparatus 900 described above. The image decoding unit 12690 may decode the encoded video data to obtain reconstructed video data and provide the reconstructed video data to the display screen 12520 via the LCD controller 12620, according to a video decoding method employed by the video decoding apparatus 900 or the image decoder 20 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to exemplary embodiments, may be a transceiving terminal including only the video encoding apparatus, or may be a transceiving terminal including only the video decoding apparatus.

Figure 26:
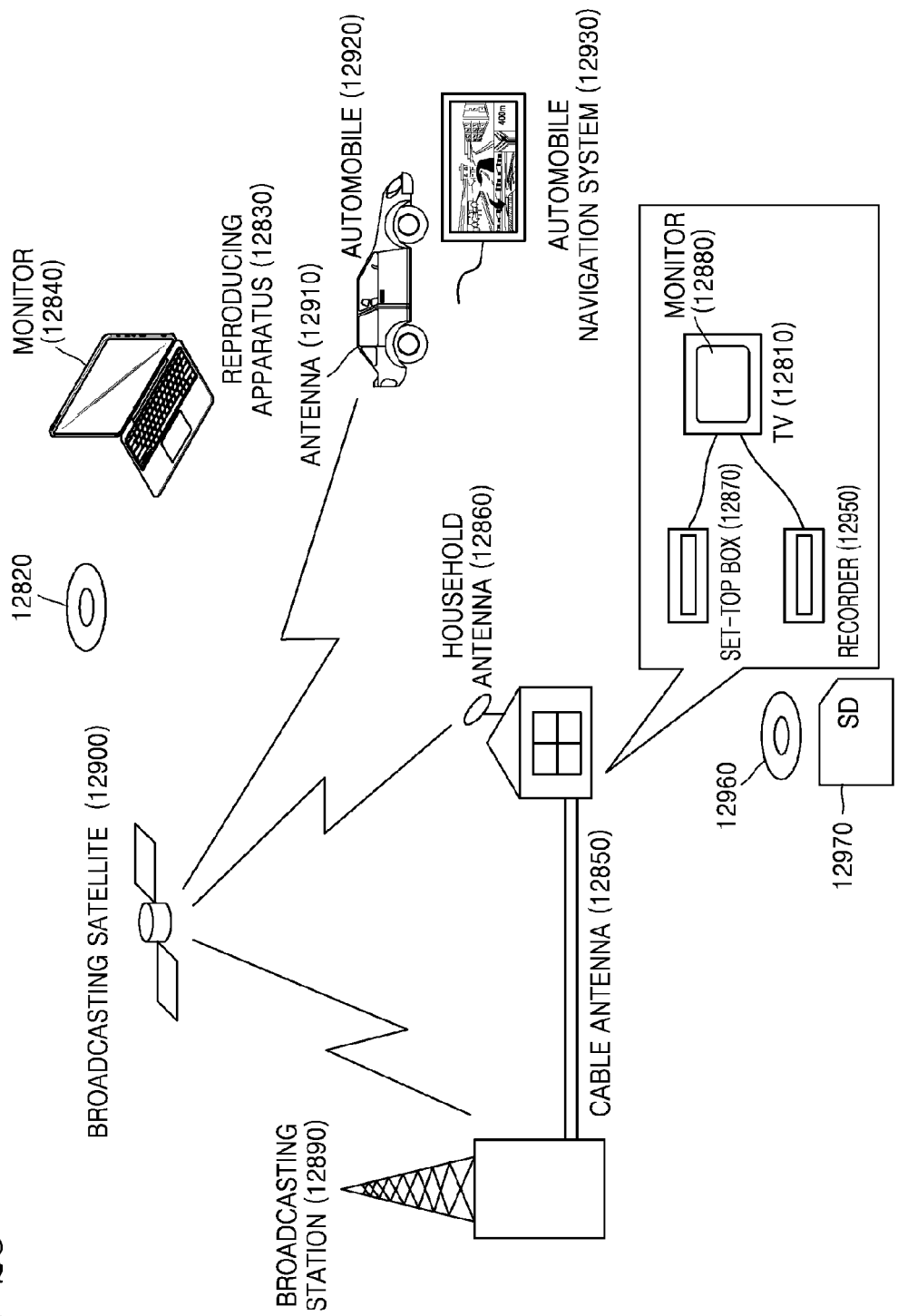
FIG. 26 is a diagram of a digital broadcast system to which a communication system is applied, according to an exemplary embodiment.

A communication system according to the exemplary embodiments is not limited to the communication system described above with reference to FIG. 24. For example, FIG. 26 illustrates a digital broadcasting system employing a communication system, according to an exemplary embodiment. The digital broadcasting system of FIG. 26 according to an exemplary embodiment may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In the house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite or terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 25. For example, the computer 12100 and the TV receiver 12810 may not be included in the camera 12530, the camera interface 12630, and the image encoding unit 12720 of FIG. 26.

Figure 27:
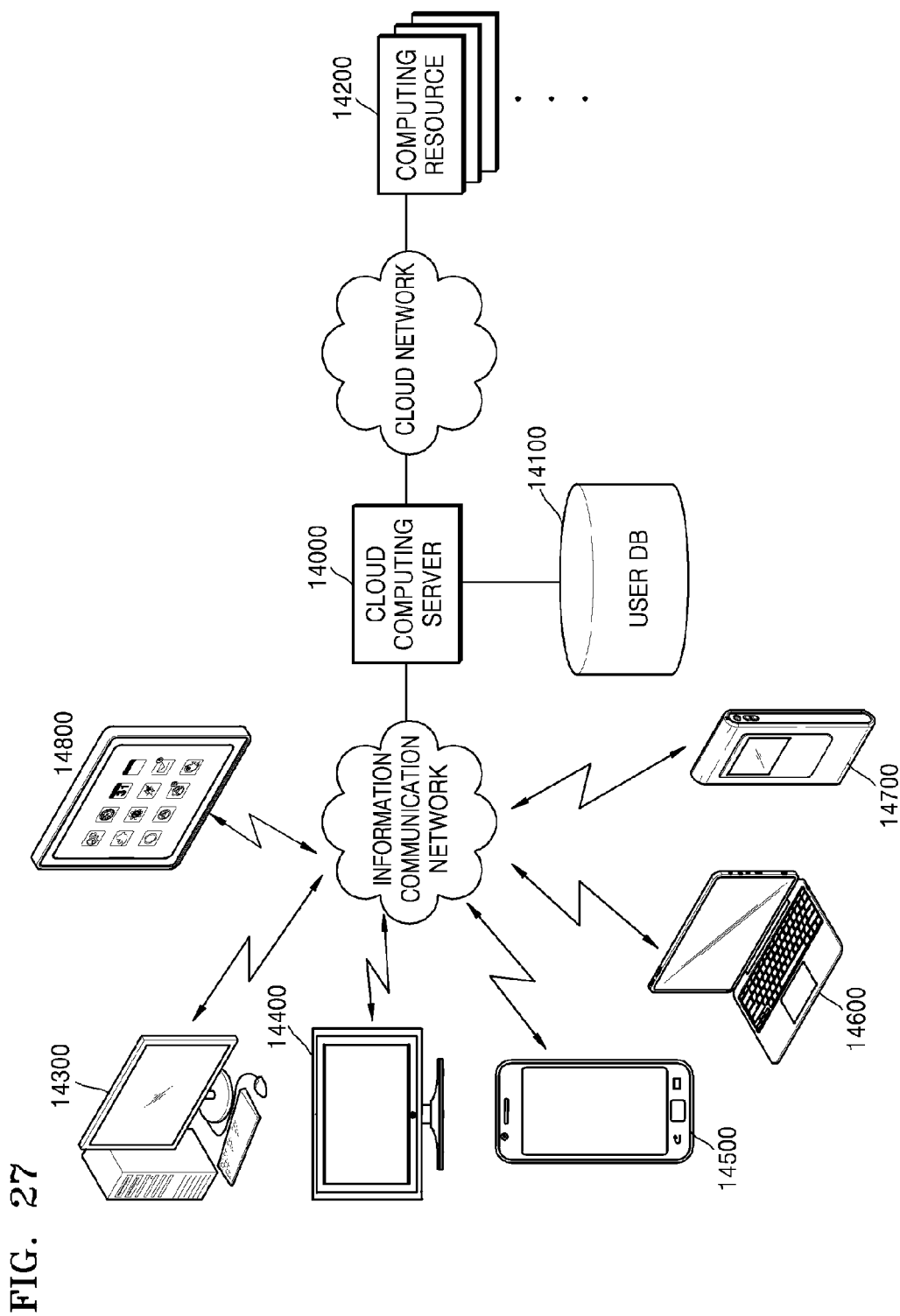
FIG. 27 is a diagram illustrating a network structure of a cloud computing system using a video encoding apparatus and a video decoding apparatus, according to an exemplary embodiment.

FIG. 27 is a diagram illustrating a network structure of a cloud computing system using a video encoding apparatus and a video decoding apparatus, according to exemplary embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his or her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining a video database distributed in different regions according to the virtualization technology.

User information about users who have subscribed for a cloud computing service is stored in the user DB 14100. The user information may include login information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, e.g., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus according to an exemplary embodiment as described above with reference to FIGS. 1A to 20. As another example, the user terminal may include a video encoding apparatus according to an exemplary embodiment as described above with reference to FIGS. 1A to 20. Alternatively, the user terminal may include both the video decoding apparatus and the video encoding apparatus according to exemplary embodiments as described above with reference to FIGS. 1A to 20.

Various applications of a video encoding method, a video decoding method, a video encoding apparatus, and a video decoding apparatus according to exemplary embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to exemplary embodiments, are not limited to the exemplary embodiments described above with reference to FIGS. 21 to 27.

It will be understood by those of ordinary skill in the art that various changes in form and details may be made therein without departing from the spirit and scope of the exemplary embodiments as defined by the appended claims.

The exemplary embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

The invention claimed is:

1. An inter-layer video decoding method comprising:
searching for a neighboring block candidate which neighbors a current block and has a motion vector in an inter-layer direction, from among a spatial neighboring block candidate located at a left side of the current block, a spatial neighboring block candidate located at a top of the current block, and temporal neighboring block candidates at co-located locations of the current block;
when the neighboring block candidate having the motion vector in the inter-layer direction is found, setting the motion vector in the inter-layer direction of the found neighboring block candidate as a disparity vector of the current block;
when the neighboring block candidate having the motion vector in the inter-layer direction is not found, searching for a neighboring block candidate which neighbors the current block and has disparity vector information, from among the spatial neighboring block candidate located at the left side of the current block, the spatial neighboring block candidate located at the top of the current block, and the temporal neighboring block candidates at the co-located locations of the current block; and
when the neighboring block candidate having the disparity vector information is found, predicting a disparity vector of the current block based on the disparity vector information of the found neighboring block candidate.

2. The inter-layer video decoding method of claim 1, wherein the searching for the neighboring block candidate having the motion vector in the inter-layer direction comprises searching for the neighboring block candidate having the motion vector in the inter-layer direction from among a spatial neighboring block candidate located lowest from blocks adjacent to a left boundary of the current block, a spatial neighboring block located rightmost from blocks adjacent to a top boundary of the current block, and the temporal neighboring block candidates at co-located locations of the current block.

3. The inter-layer video decoding method of claim 1, wherein the searching for the neighboring block candidate having the disparity vector information comprises determining whether a spatial neighboring block located lowest from blocks adjacent to a left boundary of the current block and a spatial neighboring block candidate located rightmost from blocks adjacent to a top boundary of the current block are used to perform inter-layer motion compensation.

4. The inter-layer video decoding method of claim 1, wherein the searching for the neighboring block candidate having the motion vector in the inter-layer direction comprises omitting searching for temporal neighboring block candidates and spatial neighboring block candidates located in a diagonal direction of the current block.

5. The inter-layer video decoding method of claim 1, wherein the searching for the neighboring block candidate having the motion vector in the inter-layer direction comprises searching for the neighboring block candidate having the motion vector in the inter-layer direction by prioritizing the spatial neighboring block candidate located at the left of the current block, the spatial neighboring block candidate located at the top of the current block, and the temporal neighboring block candidates at the co-located locations of the current block.

6. The inter-layer video decoding method of claim 1, wherein the searching for the neighboring block candidate having the motion vector in the inter-layer direction comprises searching for the neighboring block candidate having the motion vector in the inter-layer direction by prioritizing one of the temporal neighboring block candidates included in a co-located picture when at least two reference pictures in a time direction are found.

7. The inter-layer video decoding method of claim 1, further comprising, when the disparity vector of the current block is not predicted, determining the disparity vector of the current block by using a default disparity vector and an inter-layer depth image.

8. The inter-layer video decoding method of claim 1, further comprising, when the disparity vector of the current block is predicted to be (0,0), determining the disparity vector of the current block to be a value that is not (0,0) by using an inter-layer depth map.

9. The inter-layer video decoding method of claim 1, further comprising, when the disparity vector of the current block is predicted to be (0,0), refraining from using a mode that uses the predicted disparity vector.

10. An inter-layer video decoding apparatus comprising:
a first layer decoder configured to reconstruct a first layer image based on encoding information obtained from a bitstream; and
a disparity vector determiner configured to search for a neighboring block candidate which neighbors a second layer current block and has a motion vector in an inter-layer direction, from among a spatial neighboring block candidate located at a left side of the second layer current block, a spatial neighboring block candidate located at a top of the second layer current block, and temporal neighboring block candidates at co-located locations of the second layer current block,
wherein, when the neighboring block candidate having the motion vector in the inter-layer direction is found, the disparity vector determiner is configured to set the motion vector in the inter-layer direction of the found neighboring block candidate as a disparity vector of the second layer current block,
wherein, when the neighboring block candidate having the motion vector in the inter-layer direction is not found, the disparity vector determiner is configured to search for a neighboring block candidate which neighbors the second layer current block and has disparity vector information, from among the spatial neighboring block candidate located at the left side of the second layer current block, the spatial neighboring block candidate located at the top of the second layer current block, and the temporal neighboring block candidates at the co-located locations of the second layer current block, and
when the neighboring block candidate having the disparity vector information is found, the disparity vector determiner is configured to predict the disparity vector of the second layer current block based on disparity vector information of the found neighboring block candidate.

11. The inter-layer video decoding apparatus of claim 10, wherein the disparity vector determiner is configured to perform a search for predicting the disparity vector from among a spatial neighboring block candidate located lowest from blocks adjacent to a left boundary of the current block, a spatial neighboring block located rightmost from blocks adjacent to a top boundary of the current block, and the temporal neighboring block candidates at co-located locations of the second layer current block.

12. The inter-layer video decoding apparatus of claim 10, wherein the disparity vector determiner is configured to omit searching temporal and spatial neighboring block candidates located in a diagonal direction of the second layer current block.

13. The inter-layer video decoding apparatus of claim 10, wherein the disparity vector determiner is configured to search for the neighboring block candidate having the motion vector in the inter-layer direction by prioritizing one of the temporal neighboring block candidates included in a co-located picture when at least two reference pictures in a time direction are found.

14. The inter-layer video decoding apparatus of claim 10, wherein the disparity vector determiner is configured to determine, when the disparity vector of the current block is not predicted, the disparity vector of the current block by using a default disparity vector and an inter-layer depth image.

15. A non-transitory computer-readable recording medium having recorded thereon a program which, when executed, causes a decoding apparatus to perform an inter-layer video decoding method comprising:

searching for a neighboring block candidate which neighbors a current block and has a motion vector in an inter-layer direction, from among a spatial neighboring block candidate located at a left side of the current block, a spatial neighboring block candidate located at a top of the current block, and temporal neighboring block candidates at co-located locations of the current block;

when the neighboring block candidate having the motion vector in the inter-layer direction is found, setting the motion vector in the inter-layer direction of the found neighboring block candidate as a disparity vector of the current block;

when the neighboring block candidate having the motion vector in the inter-layer direction is not found, searching for a neighboring block candidate which neighbors the current block and has disparity vector information, from among the spatial neighboring block candidate located at the left side of the current block, the spatial neighboring block candidate located at the top of the current block, and the temporal neighboring block candidates at the co-located locations of the current block; and when the neighboring block candidate having the disparity vector information is found, predicting a disparity vector of the current block based on the disparity vector information of the found neighboring block candidate.

* * * * *